US011341595B2

(12) United States Patent
Choi et al.

(10) Patent No.: US 11,341,595 B2
(45) Date of Patent: May 24, 2022

(54) ELECTRONIC DEVICE FOR PROVIDING IMAGE RELATED TO INPUTTED INFORMATION, AND OPERATING METHOD THEREFOR

(71) Applicant: Samsung Electronics Co., Ltd., Gyeonggi-do (KR)

(72) Inventors: Dong-Bum Choi, Gyeonggi-do (KR); Sangjin Lee, Seoul (KR); Seung Hye Chyung, Seoul (KR); Jonghoon Won, Gyeonggi-do (KR); Haedong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/651,156

(22) PCT Filed: Sep. 4, 2018

(86) PCT No.: PCT/KR2018/010301
§ 371 (c)(1),
(2) Date: Mar. 26, 2020

(87) PCT Pub. No.: WO2019/066281
PCT Pub. Date: Apr. 4, 2019

(65) Prior Publication Data
US 2020/0273137 A1    Aug. 27, 2020

(30) Foreign Application Priority Data
Sep. 29, 2017   (KR) .......................... 10-2017-0128042

(51) Int. Cl.
*G06T 1/00* (2006.01)
*G06T 7/11* (2017.01)

(52) U.S. Cl.
CPC .............. *G06T 1/0007* (2013.01); *G06T 7/11* (2017.01); *G06T 2207/20132* (2013.01)

(58) Field of Classification Search
None
See application file for complete search history.

(56) References Cited

U.S. PATENT DOCUMENTS 6,463,426 B1 * 10/2002 Lipson ................. G06K 9/6206
2008/0310763 A1   12/2008 Senoo
(Continued)

FOREIGN PATENT DOCUMENTS

JP    4329849 B2    6/2009
JP    5473646 B2    2/2014
(Continued)

OTHER PUBLICATIONS

Korean Search Report dated Mar. 28, 2022.

*Primary Examiner* — Oneal R Mistry
*Assistant Examiner* — Nicolas James Boyajian
(74) *Attorney, Agent, or Firm* — Cha & Reiter, LLC

(57) ABSTRACT

Various embodiments of the present invention relate to an electronic device capable of generating a virtual image by using a user input, and an operating method therefor. The electronic device according to various embodiments of the present invention comprises a communication module and a processor, wherein the processor can be set so as to: receive an input through the electronic device or an external device functionally connected through the communication module; check situation information related to the input, wherein the situation information includes time information and object information; search for at least one image, corresponding to the situation information, among one or more images stored in the electronic device or the external device; provide the found at least one image when the at least one image corresponding to the situation information is found; gener-
(Continued)

ating an image corresponding to situation information by using at least one other image, corresponding to a part of the situation information, among the one or more images, when the at least one image corresponding to the situation information is not found; and provide the generated image.

12 Claims, 22 Drawing Sheets

(56) References Cited

U.S. PATENT DOCUMENTS

| | | |
|---|---|---|
| 2009/0175551 A1 | 7/2009 | Thom |
| 2011/0194010 A1 | 8/2011 | Nakase et al. |
| 2013/0060786 A1* | 3/2013 | Serrano ............... G06K 9/3258 707/749 |
| 2016/0140146 A1* | 5/2016 | Wexler .................. G06F 16/50 707/741 |
| 2017/0004383 A1* | 1/2017 | Lin ....................... G06K 9/6215 |
| 2017/0371898 A1* | 12/2017 | Sharma .............. G06K 9/00671 |
| 2018/0131854 A1 | 5/2018 | Chang et al. |
| 2018/0189325 A1* | 7/2018 | Hohwald ............. G06K 9/6274 |
| 2019/0370287 A1* | 12/2019 | Dong .................... G06F 16/908 |

FOREIGN PATENT DOCUMENTS

| | | |
|---|---|---|
| KR | 10-0720993 B1 | 5/2007 |
| KR | 10-2013-0060766 A | 6/2013 |
| KR | 10-2014-0127131 A | 11/2014 |
| KR | 10-2015-0064613 A | 6/2015 |
| KR | 10-1552407 B1 | 9/2015 |
| KR | 10-2016-0003553 A | 1/2016 |
| KR | 10-1663042 B1 | 10/2016 |
| KR | 10-1720250 B1 | 3/2017 |

* cited by examiner

| 1310 | TIME | 2017.08.24 14:00 |
|---|---|---|
| 1320 | LOCATION | HAN RIVER |
| 1330 | ACCURACY | 95% |
| 1340 | OBJECT INFORMATION | IDENTIFIER C |
| 1350 | WEATHER INFORMATION | SUNNY WEATHER |
| 1360 | TIME SENSITIVITY | HIGH |
| 1370 | PREFERENCE | MEDIUM |
| 1380 | PURPOSE INFORMATION | TRAVEL |
| 1390 | UPLOAD INFORMATION | 2017.08.27 SNS |

| | | 1483 |
|---|---|---|
| 1410 | TIME | 2003. 06. 17 |
| 1420 | LOCATION | PARIS, FRANCE |
| 1430 | ACCURACY | 98% |
| 1440 | OBJECT INFORMATION | EIFFEL TOWER, SEINE RIVER |
| 1450 | WEATHER INFORMATION | SUNNY WEATHER |
| 1460 | TIME SENSITIVITY | EIFFEL TOWER (LOW), SEINE RIVER (LOW) |
| 1470 | UPLOAD INFORMATION | 2003.06.20 BBS |

ELECTRONIC DEVICE FOR PROVIDING IMAGE RELATED TO INPUTTED INFORMATION, AND OPERATING METHOD THEREFOR

CLAIM OF PRIORITY

This application is a National Phase Entry of PCT International Application No. PCT/KR2018/010301, which was filed on Sep. 4, 2018 and claims a priority to Korean Patent Application No. 10-2017-0128042, which was filed on Sep. 29, 2017, the contents of which are incorporated herein by reference.

TECHNICAL FIELD

Various embodiments of the present disclosure relate to an electronic device capable of providing a virtual image related to inputted information, and an operating method therefor.

BACKGROUND ART

As portable electronic devices such as smart phones become high performance more and more, various services are being provided through the electronic devices. Various services include playing, editing, etc. of multimedia such as an image, a video, etc., in addition to a basic service such as phone call, text sending, etc.

By the virtue of the growth of a wireless Internet service, users of the electronic devices became able to experience various services by exchanging information between a plurality of the electronic devices connected to a network, in addition to playing or editing content stored in the electronic devices.

The information exchanged between the electronic devices includes peripheral information (e.g., time information, location information, etc.), etc. of the user or the electronic device.

DISCLOSURE OF INVENTION

Technical Problem

To acquire an image of more improved picture quality than that of an image acquired through an image sensor, an electronic device can transmit the photographed image to an external device. The electronic device can transmit a condition for image search to the external device and search for an image corresponding to the condition.

However, in a method of improving the picture quality of the photographed image or searching the image stored in the external device as in the aforementioned method, there is a limit in providing a virtual image a user desires to see, so it is difficult to completely meet a user's demand.

Various embodiments of the present disclosure relate to an electronic device capable of providing a virtual image, and an operating method therefor.

Technological solutions the disclosure seeks to achieve are not limited to the above-mentioned technological solutions, and other technological solutions not mentioned above would be able to be clearly understood by a person having ordinary skill in the art from the following statement.

Solution to Problem

An electronic device of various embodiments of the present disclosure includes a communication module, and a processor. The processor is set to receive an input through the electronic device or an external device functionally connected through the communication module, check situation information related to the input, wherein the situation information includes time information and object information, search for at least one image corresponding to the situation information among one or more images stored in the electronic device or the external device, in response to the at least one image corresponding to the situation information being searched, provide the found at least one image, and in response to the at least one image corresponding to the situation information not being searched, provide an image corresponding to the situation information by using at least one other image corresponding to a part of the situation information among the one or more images, and provide the provided image.

An operating method of an electronic device of various embodiments of the present disclosure includes receiving an input through the electronic device or an external device functionally connected through the communication module of the electronic device, checking situation information related to the input, wherein the situation information includes time information and object information, acquiring at least one image corresponding to part of the situation information among one or more images stored in the electronic device or the external device, and providing an image corresponding to the situation information by using the obtained at least one image, and providing the provided image.

Advantageous Effects of Invention

According to various embodiments, an electronic device may implement a virtual image a user desires to see, by acquiring respective objects from a plurality of images and synthesizing the acquired objects by using an image provision condition received from a user.

BEST MODE FOR CARRYING OUT THE INVENTION

Figure 1:
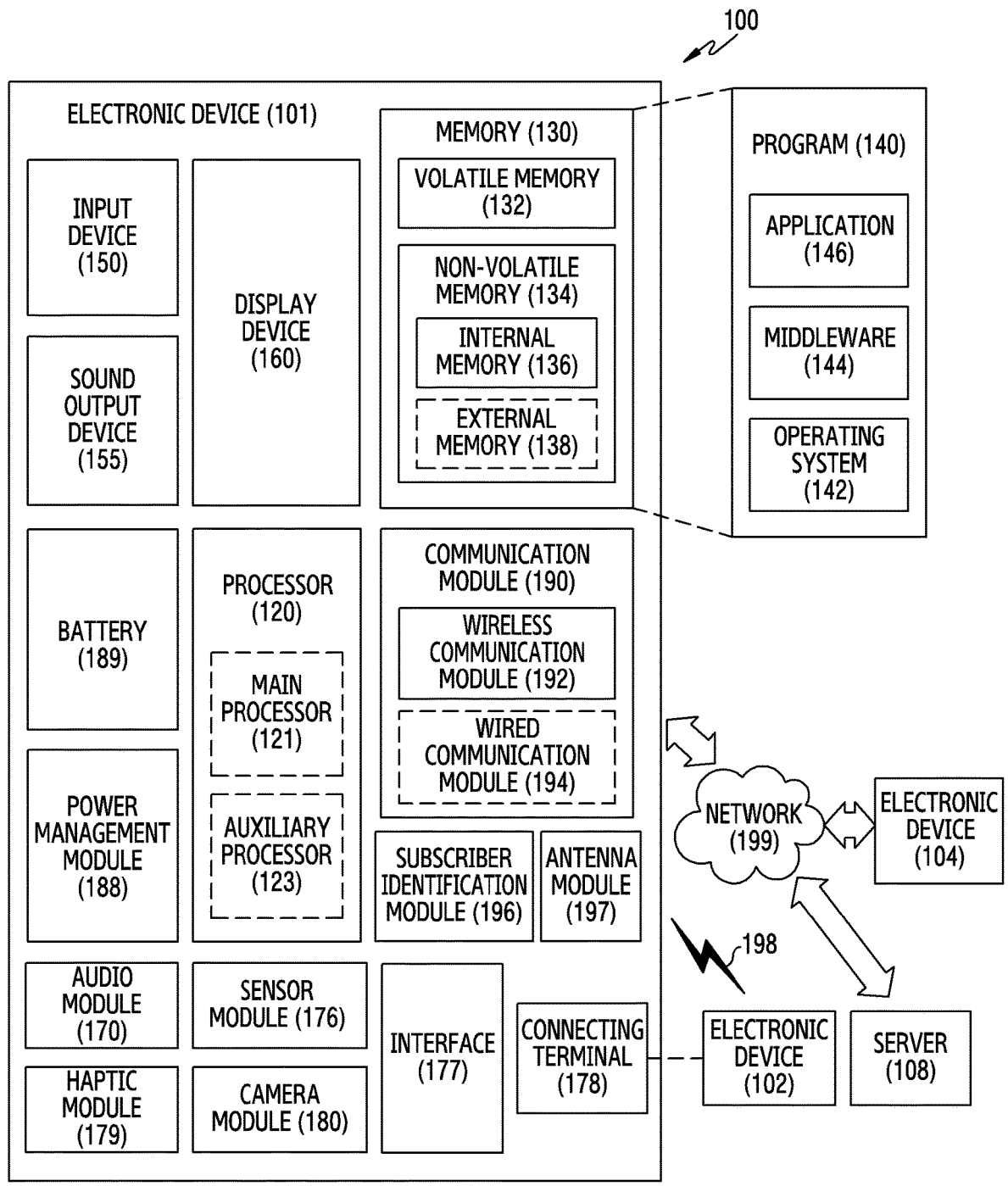
FIG. 1 illustrates an environment of a network according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

According to an embodiment, the wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
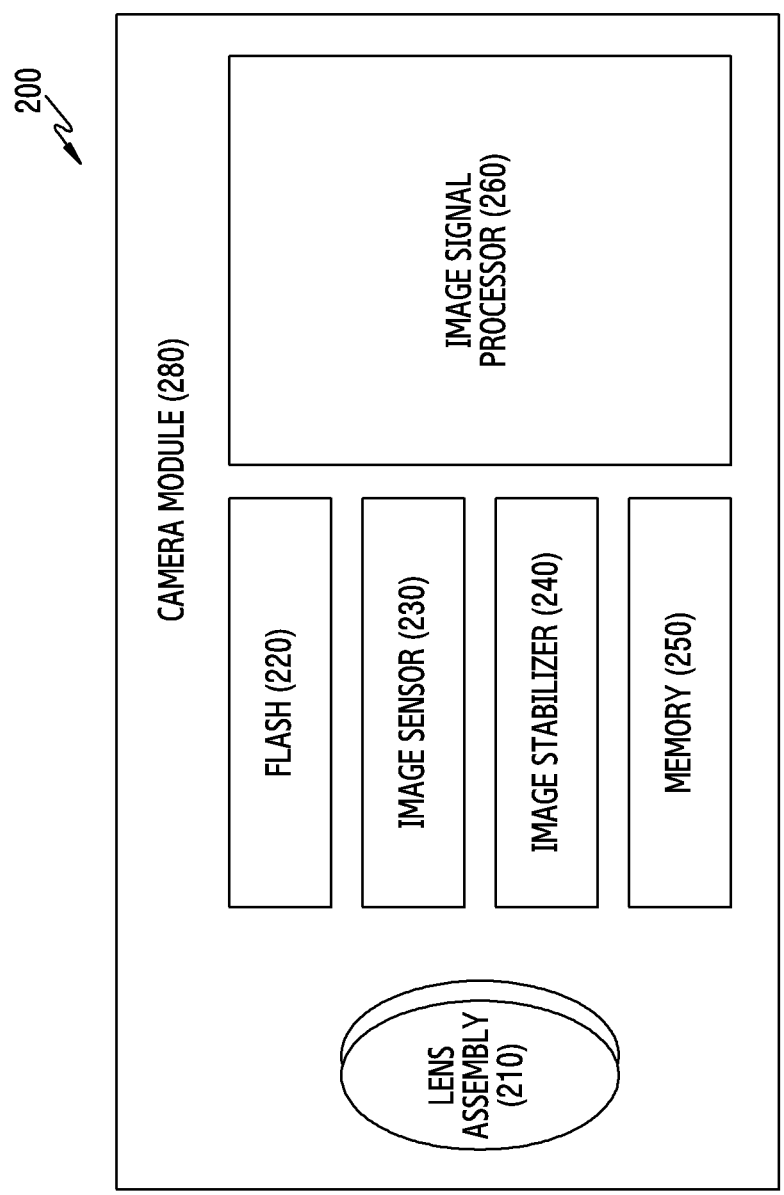
FIG. 2 illustrates a block diagram of an electronic device according to various embodiments of the present disclosure.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules180 may form a telephoto camera. Similarly, at least one of the plurality of camera modules 180 may form, for example, a front camera and at least another of the plurality of camera modules180 may form a rear camera.

Figure 3:
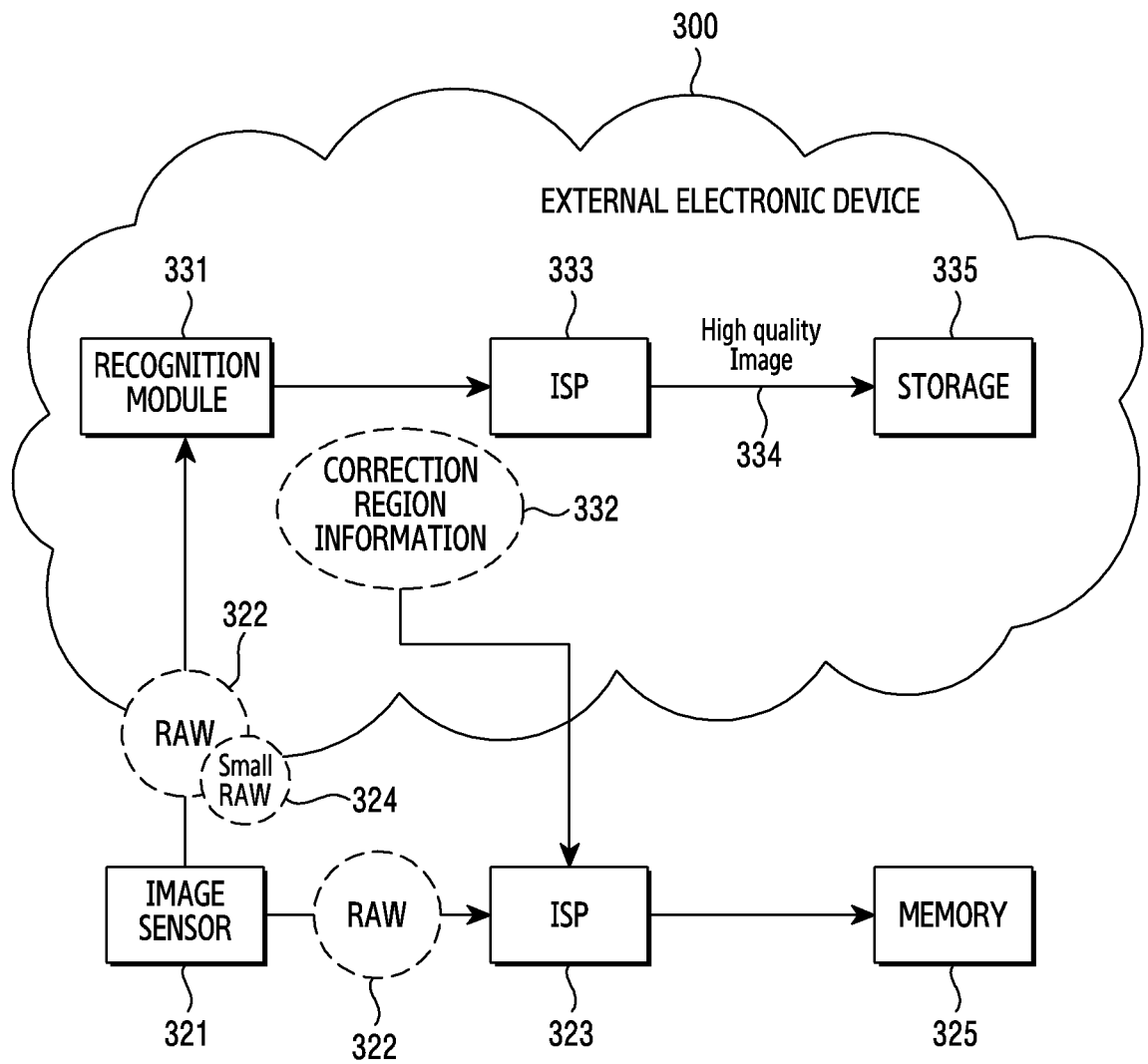
FIG. 3 illustrates a concept diagram for explaining an operation of an electronic device and an external device according to various embodiments of the present disclosure.

FIG. 3 illustrates a concept diagram for explaining an operation of an electronic device and an external device according to various embodiments of the present disclosure.

The electronic device 101 may include an image sensor 321, an ISP 323, and a memory 325. The external device 300 may include a recognition module 331, an ISP 333, and a storage 335. The recognition module 331 may be a logic module as well, and may be implemented as a processor of the external device 300 as well. The ISP 333 may be also implemented as the processor of the external device 300 and, for example, the processor of the external device 300 may perform both recognition and image processing as well. Though not illustrated, the electronic device 101 may include a communication module (e.g., the communication interface 170 or the communication module 220) capable of transmitting and/or receiving data with the external device 300. The external device 300 may include a communication module capable of transmitting and/or receiving data with the electronic device 101.

The image sensor 321 (e.g., the camera module 180) may acquire an image of an external object, and may provide a raw image 322 corresponding to this. The image sensor 321 may deliver the raw image 322 to the ISP 323. In various embodiments of the present disclosure, the image sensor 321 may provide a small raw image 324 and transmit this to the external device 300 through the communication module. In another embodiment, the processor of the electronic device 101, not the image sensor 321, may provide the small raw image 324 as well, and may transmit the provided small raw image 324 to the external electronic device 300 through the communication module. The image sensor 321 may transmit the raw image 322 to the ISP 323 or the external device 300 in a compressed state. For the sake of partial processing of the raw image 322, the image sensor 321 may compress and store the raw image 322 in an internal memory of the image sensor 321. The recognition module 331 of the external device 300 may acquire the small raw image 324 through the communication module, and segment at least one image region from the small raw image 324. The recognition module 331 may recognize each of the at least one image region divided as the segmentation result. Information associated with a plurality of image regions provided from the recognition module 331, for example, coordinate information of the image region or correction region information 332 including at least one of the recognition results may be provided. The correction region information 332 may be transmitted to the electronic device 101. By using the correction region information 332, the ISP 323 may correct the raw image 322 and accordingly to this, the corrected image may be provided. The corrected image may have, for example, a format of YUV. The corrected image may be stored in the memory 325. Or, the corrected image may be compressed, for example, according to a JPEG scheme, and the compressed image may be stored in the memory 325 as well.

In various embodiments of the present disclosure, the raw image 322 provided from the image sensor 321 may be transmitted to the external device 300, apart from the small raw image 324. Because the raw image 322 has a large capacity compared to the small raw image 324, the small raw image 324 may be first transmitted to the external device 300 and thereafter, the raw image 322 may be transmitted to the external device 300. For example, while the ISP 323 performs correction for the raw image 322, the raw image 322 may be transmitted to the external device 300 as well. The raw image 322 provided by the image sensor 321 may be uploaded to the external device 300 as it is, or a pre-processed image performing lens distortion compensation or noise elimination may be uploaded as well. The aforementioned pre-processing may be performed in the external device 300 as well. The external device 300 may perform Demosaic processing or image format deformation, or pre-processing for increasing an image recognition rate as well. The ISP 333 of the external device 300 may correct the received raw image 322. The external device 300 may correct the raw image 322 by using the previously provided correction region information 332 as well, and may correct the raw image 322 by using extended correction region information as well. The raw image 322 may have a high resolution compared to the small raw image 324 and accordingly to this, the ISP 333 of the external device 300 may acquire more detailed extended correction region information from the high-resolution image. By using the previously provided correction region information and the raw image 322 together, the ISP 333 may provide the extended correction region information as well. By correcting the raw image 322 by using the extended correction region information, the ISP 333 may acquire a high quality image 334. The high quality image 334 may be stored in the storage 335 of the external device 300, and be downloaded to the electronic device 101.

In an embodiment, the electronic device 101 may be a user device which receives a user request for image provision (hereinafter, referred to as an "image provision request") and transmits information related to the image provision request, to the external device 320.

In an embodiment, the information related to the image provision request is information (hereinafter, referred to as an "image provision condition") about a condition for an object which will be included in an image (hereinafter, referred to as a "request image") intended to be provided, and may be information provided (or identified) by the electronic device 310 on the basis of the image provision request. In an embodiment, the image provision condition may be information in which the image provision request is converted into a plurality of items and attribute values corresponding to them.

In an embodiment, the external device 300 may be an electronic device which stores a plurality of images transmitted from a plurality of electronic devices including the electronic device 101. For example, the external device 300 may be a cloud server. The plurality of images may be the raw image 322 or the small raw image 324.

In an embodiment, the external device 300 may receive an image provision condition from the electronic device 101, and provide a request image on the basis of the received image provision condition, and provide the request image to the electronic device 101. The external device 300 may provide a request image by using the plurality of images stored in the storage 335 of the external device 300.

According to various embodiments, at least one construction mentioned to be carried out in the electronic device 101 may be carried out in the external device 300, and vice versa. For example, by using a plurality of images stored in the electronic device 101 or a plurality of images stored in the external device 300 connected with the electronic device 101, the electronic device 101 may provide a request image on the basis of an image provision condition as well. For another example, the external device 300, not the electronic device 101, may provide (or identify) the image provision condition on the basis of an image provision request as well.

Figure 4A:
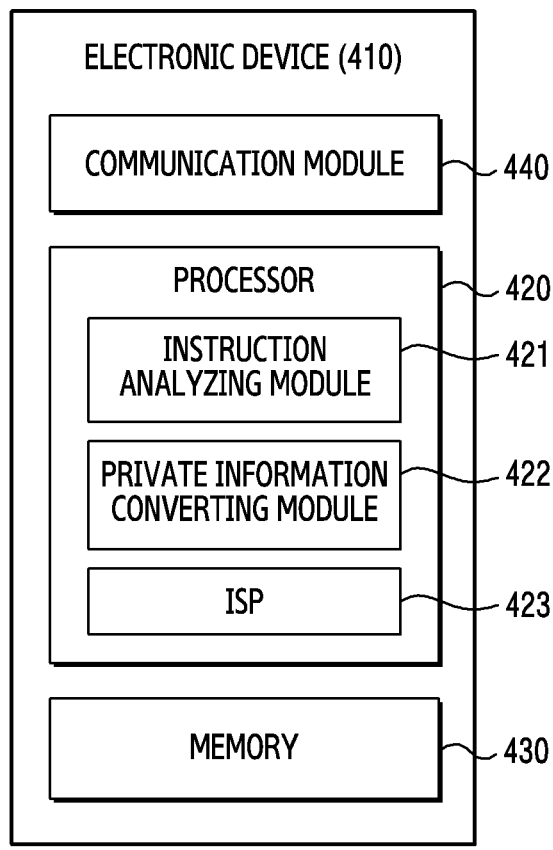
FIG. 4A is a block diagram of an electronic device according to various embodiments of the present disclosure.

FIG. 4A is a block diagram of an electronic device according to various embodiments of the present disclosure.

In an embodiment, the electronic device 410 may be a device performing an operation of providing a request image on the basis of an image provision condition. For example, the electronic device 410 may be the electronic device 101 illustrated in FIG. 1.

Referring to FIG. 4A, the electronic device 410 may include a communication module 440, a processor 420, and a memory 430.

The communication module 440 may be electrically/functionally connected with the processor 420, and be set to exchange data with an external device 450 under the control of the processor 420. For example, the electronic device 410 may transmit an image provision request to the external device 450 through the communication module 440, and receive a request image from the external device 450.

The memory 430 may be electrically/functionally connected with the processor 420, and be set to store data provided by the electronic device 410 or data received from the external device 450 under the control of the processor 420. For example, the memory 430 may store an image provision request or an image provision condition provided on the basis of the image provision request. That is, the memory 430 may store a history of the image provision request or the image provision condition. For another example, the memory 430 may store a request image provided from the external device 450. For further example, the memory 430 may store a user profile that is used for a primate information converting module 422 to convert private information. For yet another example, the memory 430 may store a plurality of images which are photographed by a user or are downloaded through a network. At this time, the memory 430 may store at least one information about the stored image, together. The at least one information may include at least one of time information of the stored image, location information, weather information, object (e.g., figure) information, and background information. The figure information may include at least one of relation information with a user and/or information about an accuracy of the relation information.

In an embodiment, the image stored in the memory 430 may be a form of raw data, and may be encoded data (e.g., jpg) as well.

In an embodiment, the image stored in the memory 430 may include a static image and a dynamic image.

The processor 420 may be at least one or more included in the electronic device 410, to perform a specified function of the electronic device 410.

Referring to FIG. 4A, the processor 420 may include an instruction analyzing module 421, a private information converting module 422, and an image signal processor (ISP) 423.

The instruction analyzing module 421 may identify situation information and an image provision condition on the basis of an image provision request.

In an embodiment, the image provision request is a user request for image provision, and may include at least one description or expression (or user comment) for restricting an image intended to be provided. For example, the image provision request may be inputs (e.g., a text input, a sound input, etc.) of various forms including a user comment such as "I want to look at the photograph in which I went to the Seoul Park with mom when I was on summer vacation of third grade of middle school".

In an embodiment, the situation information may be information expressing, as a plurality of items and attribute values corresponding to them, various information included in the image provision request and being able to restrict an image. The situation information may include at least one of time information, location information, weather information, object information (e.g., figure information), background information, and motion information. For example, the instruction analyzing module 421 may identify a plurality of items (time, figure, and location) and attribute values (summer vacation of third grade of middle school, mom and I, and the Seoul Park) corresponding to them, such as "time—summer vacation of third grade of middle school, figure—I and mom, and location—the Seoul Park", on the basis of the image provision request such as "I want to look at the photograph in which I went to the Seoul Park with mom when I was on summer vacation of third grade of middle school".

In an embodiment, the attribute value may be one specific value as well, and may be a specific range as well.

In an embodiment, the instruction analyzing module 421 may include a natural language analyzing module (not shown). In determining an image provision condition on the basis of an image provision request, the instruction analyzing module 421 may use a natural language analysis result of a user comment included in the image provision request. The natural language analysis may be performed by the natural language analyzing module, and include lexical analysis, syntactic analysis, and semantic analysis. For example, by using the natural language analysis result of a user comment such as "I want to loot at the photograph in which I went to the Seoul Park with mom when I was on summer vacation of third grade of middle school", the instruction analyzing module 421 may identify an attribute value of object information among situation information as 'mom and I' although a figure explicitly disclosed in the comment is only "mom".

In an embodiment, the image provision condition is a condition for an object which will be included in a request image, and may be determined on the basis of at least one description or expression included in an image provision request, or at least part of situation information.

In an embodiment, the instruction analyzing module 421 may include a natural language analyzing module (not shown). In identifying an image provision condition on the basis of an image provision request, the instruction analyzing module 421 may use a natural language analysis result of a user comment included in the image provision request. The natural language analysis may be performed by the natural language analyzing module, and include lexical analysis, syntactic analysis, and semantic analysis. For example, by using the natural language analysis result of a user comment such as "I want to look at the photograph in which I went to the Seoul Park with mom when I was on summer vacation of third grade of middle school", the instruction analyzing module 421 may identify an attribute value of object information among situation information as 'mom and I' although a figure explicitly disclosed in the comment is only "mom".

In an embodiment, the image provision condition may include a condition for an operation of an object. For example, the image provision condition may include a condition for an "operation in which I of 1 Jul. 1997 to 31 Aug. 1997 and mom of 1 Jul. 1997 to 31 Aug. 1997 hold hands".

In accordance with the above-mentioned description, the image provision condition may identified. However, in response to part of situation information of the identified image provision condition including private information, there may be an error in a process that will be performed thereafter, that is, a process of identifying an object which will be included in a request image or a process of identifying an image including the object which will be included in the request image. Accordingly, the processor 420 of the electronic device 410 needs to convert the private information included in the situation information.

The private information converting module 422 may convert an attribute value including private information of a user or a figure related to the user, among situation information (i.e., a plurality of items included in an image provision condition and attribute values corresponding to them), into another attribute value not including the private information. Here, private information about a specific figure may represent information restricted only for the specific figure or information whose meaning depends on who the user is. For example, in response to an image provision request including a comment of "I want to look at the photograph in which I went to the Seoul Park with mom when I was on summer vacation of third grade of middle school", the "summer vacation of third grade of middle school" and "mom" may include the private information about the user, because their meaning information may depend on a speaker (i.e., the user) of the comment.

In an embodiment, the private information converting module 422 may obtain that private information about a user is included in at least one attribute value, among a plurality of items included in situation information and attribute values corresponding to them. For example, the private information converting module 422 may obtain that the private information is included in "time—summer vacation of third grade of middle school" among "time—summer vacation of third grade of middle school, figure—mom and I, and location—the Seoul Park".

In an embodiment, the private information converting module 422 may use a preset criterion in identifying that private information is included in situation information. The private information converting module 422 may distinguish whether an attribute value of a specific item is convertible by a standard unit or reference unit of the corresponding item, among the situation information (i.e., a plurality of items and attribute values corresponding to them). In response to the attribute value of the specific item being impossible to be converted by the standard unit or reference unit of the corresponding item, it may be distinguished that the attribute value includes private information about a user or a figure related to the user. For example, because an attribute value (summer vacation of third grade of middle school) of a specific item (time) is impossible to be converted by the standard unit or reference unit (i.e., year, month, day, hour, minute, and second) of the corresponding item (time), the private information converting module 422 may distinguish that the attribute value includes the private information about the user or the figure related to the user.

In an embodiment, the private information converting module 422 may convert an attribute value including private information about a user, into an attribute value not including the private information, on the basis of a user profile stored in the memory 430.

In an embodiment, a user profile is information describing a user, and may be reference information which is used to convert an attribute value including private information into an attribute value not including the private information. For example, the user profile may include one of a face photograph of the user or personal details (e.g., the date of one's birth, a resident registration number, a home address, an academic background, a criminal record, etc.).

For example, by using the date of user's birth included in the user profile, the private information converting module 422 may convert an attribute value including private information "summer vacation of third grade of middle school" into an attribute value not including the private information "1 Jul. 1997~31 Aug. 1997".

In response to converting the attribute value including the private information into the attribute value not including the private information, the private information converting module 422 may update situation information on the basis of the converted attribute value. For example, the private information converting module 422 may change or update situation information ("time—summer vacation of third grade of middle school, figure—I and mom, and location—the Seoul Park") before the converting of the private information, into another situation information ("time—1 Jul. 1997~31 Aug. 1997, figure—I and mom, and location—the Seoul Park").

The ISP 423 may be the ISP 323 of FIG. 3. The ISP 423 may acquire each object image from each of a plurality of images stored in the memory 430, or acquire a plurality of object images from the external device 450 through the communication module 440. By synthesizing the acquired object images in one image, the ISP 423 may provide a request image. For example, by acquiring a plurality of object images from the external device 450 and synthesizing the acquired plurality of object images, the electronic device 410 may provide a request image. For another example, by acquiring each object image from at least one image among a plurality of images stored in the memory 430 of the electronic device 410 and synthesizing the acquired object images, the electronic device 410 may provide a request image.

In an embodiment, in response to the ISP 423 acquiring an object image on the basis of a plurality of images stored in the memory 430, the ISP 423 may search for at least one image (hereinafter, referred to as an "original image") including an object image which will be included in a request image, among the plurality of images stored in the memory 430. The original image may be the raw image 322 or the small raw image 324. The ISP 423 may search for at least one original image including an object image, among the plurality of images stored in the memory 430, on the basis of an image provision condition. For example, the electronic device 410 may search the memory 430 for an original image including an image of the Seoul Park corresponding to 1 Jul. 1997~31 Aug. 1997 (i.e., an image including an object or subject representing the Seoul Park), an original image including an image of a user corresponding to 1 Jul. 1997~31 Aug. 1997, and an original image including an image of mom corresponding to 1 Jul. 1997~31 Aug. 1997, on the basis of the image provision condition ("the Seoul Park of 1 Jul. 1997~31 Aug. 1997", "I of 1 Jul. 1997~31 Aug. 1997", and "mom of 1 Jul. 1997~31 Aug. 1997").

In an embodiment, in response to acquiring original images including an object image which will be included in a request image, the ISP 423 may acquire the object image which will be included in the request image, from the acquired original images. In an embodiment, an operation of acquiring the object image which will be included in the request image may include an operation of, by editing the original image, acquiring a sub image within the original image, which indicates an object that will be included in the request image. For example, the ISP 423 may acquire correction region information 332 of the external device 300.

In an embodiment, to acquire an object image which will be included in a request image from the acquired original images, the ISP 423 may segment or crop the acquired original image. For example, the ISP 423 may acquire the segmented at least one image region from the small raw image 324.

In an embodiment, by identifying a portion of an image acquired by using a contour line of an object which will be included in a request image from the acquired original image, and cutting out or segmenting the identified portion, the ISP 423 may acquire an object image. For example, in response to the ISP 423 acquiring the original image including an image of an object "the Seoul Park of 20 Jul. 1997" from the memory 430, the ISP 423 may acquire an object image of "the Seoul Park of 20 Jul. 1997", by using a contour line of an object or subject (e.g., a signboard capable of becoming a landmark of the Seoul Park, a gate, a bronze statue, etc.) representing the Seoul Park.

In an embodiment, the ISP 423 may acquire the whole region of an image as an object as well.

In an embodiment, in response to distinguishing that original images including an object image which will be included in a request image not existing in the memory 430, the ISP 423 may perform an additional search operation on the basis of an attribute of an object which will be included in the request image. At this time, the attribute of the object may be an attribute representing a sensitivity to time. For example, it may be considered that the object or subject representing the Seoul Park is a lifeless thing whose variation is not large with respect to time. The ISP 423 may differently set a condition for time, and additionally perform a search operation on the basis of the differently set condition. For example, in response to an original image including the Seoul Park corresponding to 1 Jul. 1997~31 Aug. 1997 not existing, the ISP 423 may search for an original image including an image of the Seoul Park corresponding to another time interval (e.g., 1 Jul. 1996~31 Aug. 1998) including a time interval of 1 Jul. 1997~31 Aug. 1997.

In an embodiment, in response to an original image including an object corresponding to an image provision condition not being searched although additional search has been performed, the ISP 423 may directly provide the object corresponding to the image provision condition. For example, the ISP 423 may provide the object corresponding to the image provision condition by using a vector drawing technique. For another example, the ISP 423 may provide the object corresponding to the image provision condition by using a machine learning technique. At this time, learning data of machine learning may be a plurality of images stored in the memory 430. For further example, the ISP 423 may provide the object corresponding to the image provision condition by using a feature commonly obtained from the plurality of images stored in the memory 430. When the image provision condition includes a condition of objects of I, mom, and the Seoul Park of 1 Jul. 1997~31 Aug. 1997 and a condition for an operation in which mom and I hold hands, in response to an image that mom and I hold hands not existing, the ISP 423 may provide an object that I and mom hold hands on the basis of a feature commonly obtained from other images holding hands, stored in the memory.

In an embodiment, the ISP 423 may provide a request image by using the acquired or provided object images. In an embodiment, the ISP 423 may provide the request image by synthesizing the acquired or provided object images. In an embodiment, the ISP 423 may provide the request image by disposing or configuring the acquired or provided object images in mutually different positions of one image. For example, the ISP 423 may provide the request image by disposing, in mutually different regions within one image, an image of an object "I" acquired from a first original image stored in the memory 430 and an image of an object "the Seoul Park" acquired from a second original image stored in the memory 430. A position in which the acquired object will be disposed within the request image may be identified on the basis of whether the acquired object has been disposed in which position in an original image. For example, the ISP 423 may correct the raw image 322 by using the correction region information 332 and accordingly to this, may provide a corrected image (i.e., a request image) as well. For another example, the ISP 423 may provide a new image (i.e., a request image) not existing earlier, by using the correction region information 332 as well.

In another embodiment, the ISP 423 may provide a request image by overlaying one object image among the acquired or generated object images on another object image. For example, the ISP 423 may dispose an image of an object "the Seoul Park of 1 Aug. 1997" in a specific region of the same image, and overlay and dispose an image of an object "I of 20 Jul. 1997" on the image "the Seoul Park" disposed in the specific region of the same image.

In an embodiment, before disposing the acquired or provided object images, the ISP 423 may process the acquired or provided object images, in consideration of a unification sense or a harmony with another object image which will be disposed. In an embodiment, the ISP 423 may adjust attributes (e.g., white balances, noises, colors, sizes, etc.) related to screen displaying, of the acquired or provided object images. For example, in response to an object image "the Seoul Park of 1 Aug. 1997" being a black and white image, and an object image "I of 20 Jul. 1997" being a color image", the ISP 423 may process a color image of "I of 20 Jul. 1997" into black and white. For another example, object image processing may include at least one of white balance adjustment, color adjustment, noise reduction, sharpen, and detail enhancement.

In another embodiment, after disposing the acquired or provided object images, the ISP 423 may perform processing for reducing a sense of incongruity between the disposed object images. For example, the ISP 423 may perform blur processing for a boundary surface (or boundary) of each object image in the completely disposed image, to suppress a sense of incongruity capable of occurring at a boundary between mutually different object images. For another example, the ISP 423 may perform refinement processing for a boundary surface (or boundary) at which two or more objects contact with each other, to process the boundary surface (or boundary) smoothly. For further example, in response to there being a difference of spatial sequential relationship between respective object images or a depth between the respective object images in the completely disposed image, the ISP 423 may perform blur or deconvolution processing for a specific object image, on the basis of a PSF characteristic of a lens dependent on a distance from a focus. This process may be carried out in a pre-processing process before the disposing of the object images as well.

The processor 420 may provide a request image provided by the ISP 423, to a user. For example, the processor 420 may control a display (not shown) to output the provided request image on a screen.

Though not illustrated in FIG. 4A, the electronic device 410 may further include an additional construction. For example, the electronic device 410 may further include an input module (e.g., a keyboard, a mouse, a microphone, etc.) or an output module (e.g., a display).

Figure 4B:
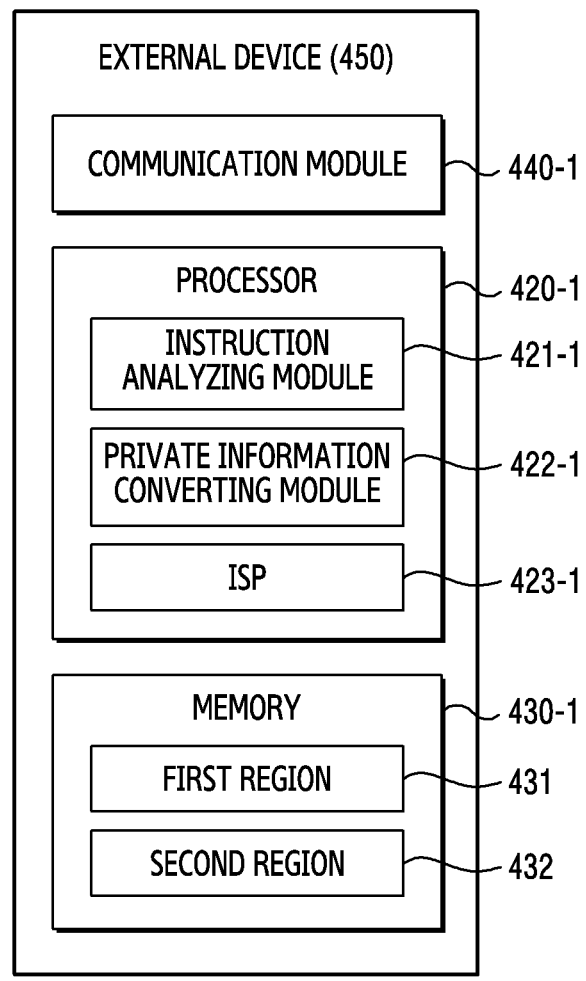
FIG. 4B is a block diagram of an external device according to various embodiments of the present disclosure.

FIG. 4B is a block diagram of an external device according to various embodiments of the present disclosure.

In various embodiment of the present disclosure, an operation of providing a request image on the basis of an image provision condition may be performed in the electronic device 410 or the external device 450. Accordingly, the external device 450 may include at least one module for providing the request image on the basis of the image provision condition. For example, the external device 450 may receive an image provision request from the electronic device 410, and provide a request image on the basis of the received image provision request. The external device 450 may include at least one module for providing the request image on the basis of the received image provision request.

In an embodiment, the external device 450 may be the external device 300.

In an embodiment, the external device 450 may include a communication module 440-1 and a processor 420-1. The communication module 440-1 and the processor 420-1 may perform the same functions as the communication module 440 and the processor 420, respectively. The processor 420-1 may include an ISP 423-1. The ISP 423-1 may be the ISP 333.

In an embodiment, the external device 450 may include a memory 430-1. The memory 430-1 may store a plurality of images similarly with the memory 430. In an embodiment, the memory 430-1 may store data provided by the external device 450 or data transmitted (or uploaded) by a plurality of electronic devices including the electronic device 410.

In an embodiment, the memory 430-1 may include two regions divided mutually. At this time, the mutually divided two regions may be a first region 431 and a second region 432. In an embodiment, the first region 431 and the second region 432 may be divided physically or according to an access authority.

In an embodiment, the first region 431 of the memory 430-1 may be a storage space specified to a specified person (e.g., a user), or dedicated to the specified person. For example, in response to the first region 431 being specified or dedicated to a figure A, the first region 431 may store only information (e.g., image) transmitted by the figure A (or by an electronic device of the figure A). For another example, in response to the first region 431 being specified or dedicated to the figure A, the first region 431 may store only private information of the figure A (e.g., a user profile of the figure A) or information (e.g., an image including a face of the figure A) including the private information. For further example, in response to the first region 431 including a first region A (not shown) and a first region B (not shown), and the first region A being specified or dedicated to the figure A, and the second region B being specified or dedicated to the figure B, the first region B may store private information of the figure A or information including the private information, under the agreement of the figure A.

In an embodiment, the second region 432 of the memory 430-1 may be a storage space which is not specified or dedicated to a specified person. For example, the second region 432 may be a storage space which is not included in the first region 431. For another example, the second region 432 may store an image photographed by a user not registered to the external device 300, or an image not capable of specifying a photographer. For further example, the second region 432 may store private information of the specified person (e.g., a user) or information including the private information, under the agreement of the specified person.

In an embodiment, the ISP 423-1 may identify a search region of the memory 430-1 on the basis of an attribute of an object which will be included in a request image. The attribute of the object which will be included in the request image may be an attribute representing the inclusion or non-inclusion of private information of a user or a figure related to the user. For example, in response to an object image which will be included in the request image being "the Seoul Park of 1 Jul. 1997~31 Aug. 1997", "the Seoul Park" is irrelevant to the private information of the user or the figure related to the user, so the ISP 423-1 may search the second region 432 of the memory 430-1 for original images. For another example, in response to the object image which will be included in the request image being "I (or a user) of 1 Jul. 1997~31 Aug. 1997", an object includes private information (e.g., a face photo) of the user, so the ISP 423-1 may search the first region 431 of the memory 430-1 for original images including the object image which will be included in the request image. The ISP 423-1 may search the first region 431 or second region 432 of the memory 430-1 for stored images, and acquire the original images including the object image which will be included in the request image according to the search result, or distinguish that the original images including the object which will be included in the request image do not exist in the memory 430-1.

In an embodiment, the ISP 423-1 may previously get agreement from a specified person (e.g., a user) specified to the first region 431, before searching the first region 431 of the memory for the object which will be included in the request image.

In an embodiment, the processor 420-1 may control the communication module 440-1 to transmit a request image to the electronic device 410.

Figure 5:
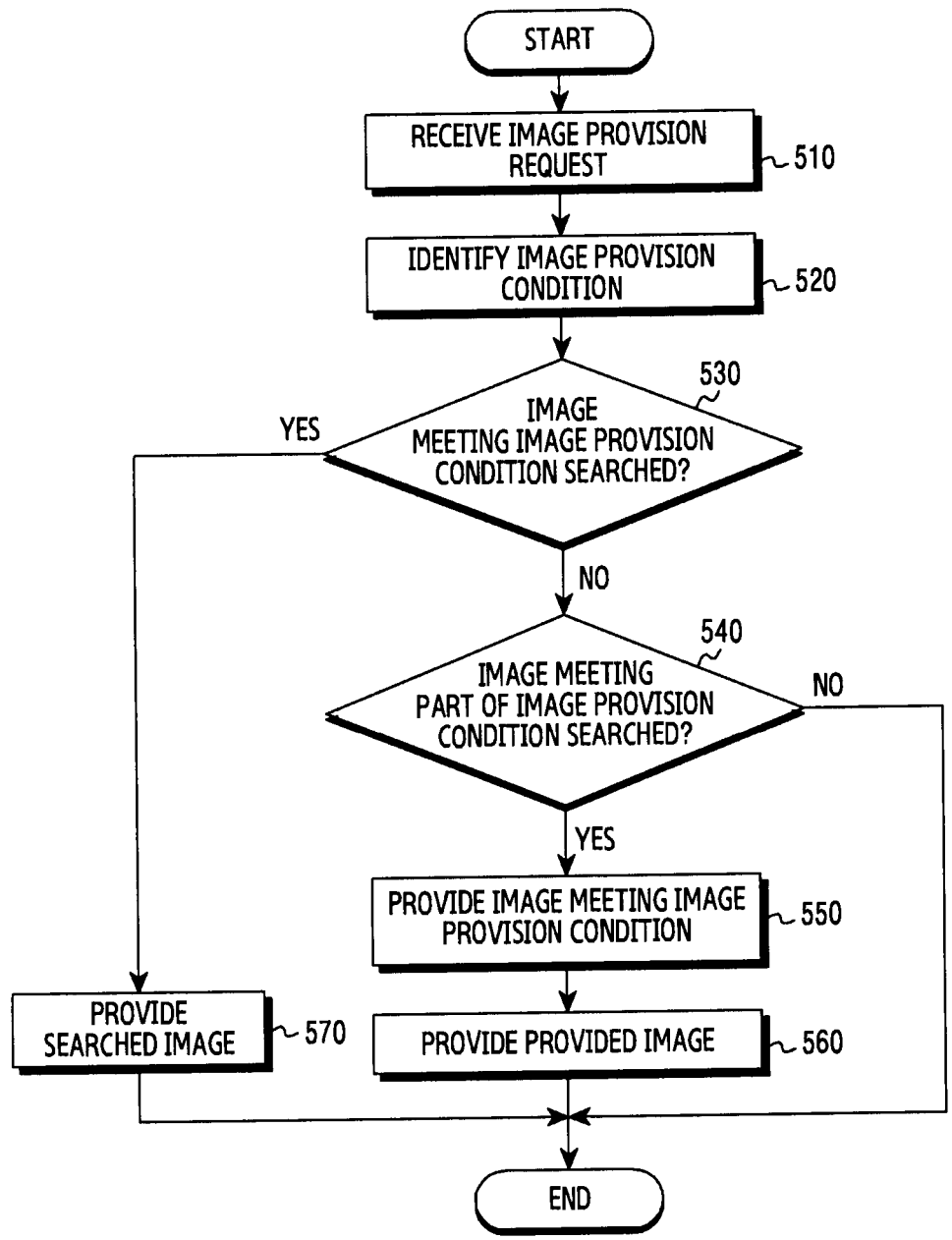
FIG. 5 is a flowchart for providing an image meeting an image provision condition in an electronic device according to various embodiments of the present disclosure.

FIG. 5 is a flowchart for providing an image meeting an image provision condition in an electronic device according to various embodiments of the present disclosure.

In operation 510, the processor 420 may receive an image provision request. In an embodiment, the processor 420 may receive the image provision request through an input module (not shown). The image provision request is a user request for image provision, and may be inputs of various forms such as a text input, a voice input, a touch input to a menu included in a user interface provided to a display, etc. For example, the image provision request may be a user input of inputting a text such as "I want to look at the photograph in which I went to the Seoul Park with mom when I was on summer vacation of third grade of middle school", to an input window provided to a screen.

In operation 520, the processor 420 may identify an image provision condition. In an embodiment, the processor 420 may identify the image provision condition on the basis of the image provision request received in operation 510. The image provision condition may be identified on the basis of situation information representing a plurality of items and attribute values corresponding to them. For example, the processor 420 may identify an image provision condition for an object which will be included in a request image such as ("the Seoul Park of 1 Jul. 1997~31 Aug. 1997", "I of 1 Jul. 1997~31 Aug. 1997", and "mom of 1 Jul. 1997~31 Aug. 1997"), on the basis of the image provision request received in operation 510 or the situation information.

In operation 530, the processor 420 may search for an image meeting the image provision condition. The processor 420 may search the memory 430 for the image meeting the image provision condition, or transmit a search request for the image meeting the image provision condition to the external device 450.

In an embodiment, the image meeting the image provision condition may represent an image including all objects each having a specific condition, included in the image provision condition.

In response to the image meeting the image provision condition being searched, in operation 570, the processor 420 may provide the searched image.

In response to the image meeting the image provision condition not being searched, in operation 540, the processor 420 may identify whether original images meeting a part of the image provision condition are searched. For example, in response to the image provision condition being ("the Seoul Park of 1 Jul. 1997~31 Aug. 1997", "I of 1 Jul. 1997~31 Aug. 1997", and "mom of 1 Jul. 1997~31 Aug. 1997"), the processor 420 may identify whether an original message including an object image "the Seoul Park of 1 Jul. 1997~31 Aug. 1997", an original message including an object image "I of 1 Jul. 1997~31 Aug. 1997", and an original message including an object image "mom of 1 Jul. 1997~31 Aug. 1997" are each searched.

In response to the original images meeting the part of the image provision condition being searched, in operation 550, the processor 420 may provide the image meeting the image provision condition. The image meeting the image provision condition may be described as a request image below.

In an embodiment, the processor 420 may acquire an object image which will be included in the request image from the searched original image. In an embodiment, an operation of acquiring the object image which will be included in the request image may mean an operation of acquiring an image (object image) representing an object which will be included in the request image, by segmenting or cropping the original image.

In an embodiment, the processor 420 may provide a request image by using the acquired at least one object image. For example, in response to acquiring a first object image and a second object image which will be included in the request image, the processor 420 may provide a request image by synthesizing the first object image and the second object image in one image. In detail, the processor 420 may provide the request image, by disposing or configuring the first object image and the second object image in mutually different positions of one image.

In operation 560, the processor 420 may provide the provided request image. In an embodiment, the processor 420 may control a display to display the request image provided in operation 550 on a screen.

Although not illustrated, the processor 420 may receive a feedback of a user for the provided request image. In an embodiment, the processor 420 may receive the feedback of the user through an input module or an interface displayed on the screen. For example, after providing the request image in operation 560, the processor 420 may control the display to display a user interface for receiving a user feedback or evaluation (e.g., stars), and receive a user input to the displayed user interface. The user evaluation or feedback for the request image may be used for updating an attribute (e.g., an accuracy, a preference, etc.) of the original image of an object image (e.g., a first object image or a second object image) included in the request image. For example, in response to the first object image being acquired from a first original image stored in the memory 430 of the electronic device 410, the processor 420 may control the memory 430 to update a value of at least one attribute among several attributes of the first original image, on the basis of the user evaluation or feedback.

According to various embodiments of the present disclosure, at least some operations disclosed in FIG. 5 may be performed by the processor 420-1 of the external device 450.

In an embodiment, in response to operation 510 being performed by the processor 420-1 of the external device 450, the processor 420-1 may receive an image provision request from the electronic device 410 through the communication module 440 1.

In an embodiment, in response to operation 530 or operation 540 being performed by the processor 420-1 of the external device 450, the processor 420-1 may search images stored in the memory 430-1 of the external device 450 for an image meeting at least a part of an image provision condition.

In an embodiment, in response to operation 530 or operation 540 being performed by the processor 420-1 of the external device 450, the processor 420-1 may identify a search region of the memory 430-1 of the external device 450 on the basis of an attribute of an object which will be included in the request image. The attribute of the object may be an attribute representing the inclusion or non-inclusion of private information of a user or a figure related to the user.

Figure 6:
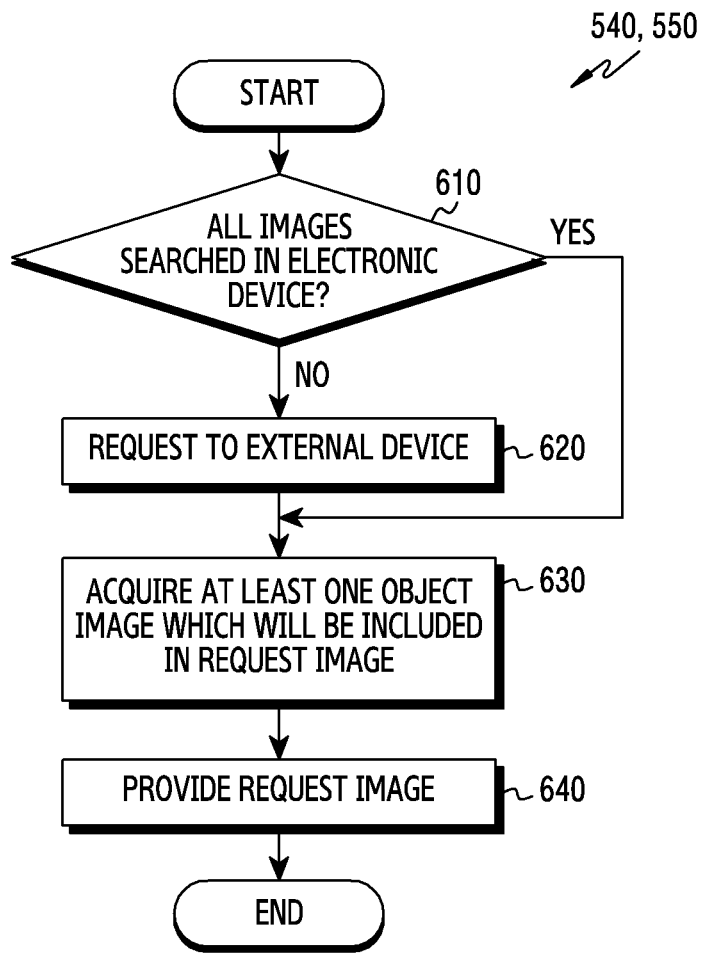
FIG. 6 is a detailed flowchart of an operation of searching for an image meeting a part of an image provision condition and an operation of providing an image meeting the image provision condition in an electronic device according to various embodiments of the present disclosure.

FIG. 6 is a detailed flowchart of an operation (operation 540) of searching for an image meeting a part of an image provision condition and an operation (operation 550) of providing an image meeting the image provision condition in an electronic device according to various embodiments of the present disclosure.

In operation 610, in response to the image meeting the part of the image provision condition being searched, the processor 420 may identify whether the searched all images have been searched in the electronic device 410.

In response to the searched some images having been searched in the memory 430-1 of the external device 450 not the memory 430 of the electronic device 410, the processor 420 may transmit a request for the searched some images (i.e., original images) or an object image included in the searched some images, to the external device 450.

In operation 630, the processor 420 may acquire at least one object image which will be included in a request image. For example, in response to the search all images being searched in the electronic device 410, the processor 420 may acquire at least one object image, by segmenting or cropping each of the searched all images. For another example, in response to transmitting a request for an object image included in the searched some images to the external device 450, the electronic device 410 may acquire at least one object image which will be included in the request image, by receiving the requested object image from the external device 450. For further example, in response to receiving the searched some images from the external device 450, the electronic device 410 may acquire an object image by segmenting or cropping the received image as well.

Operation 640 is similar with operation 550 and thus, a detailed description is omitted.

Figure 7:
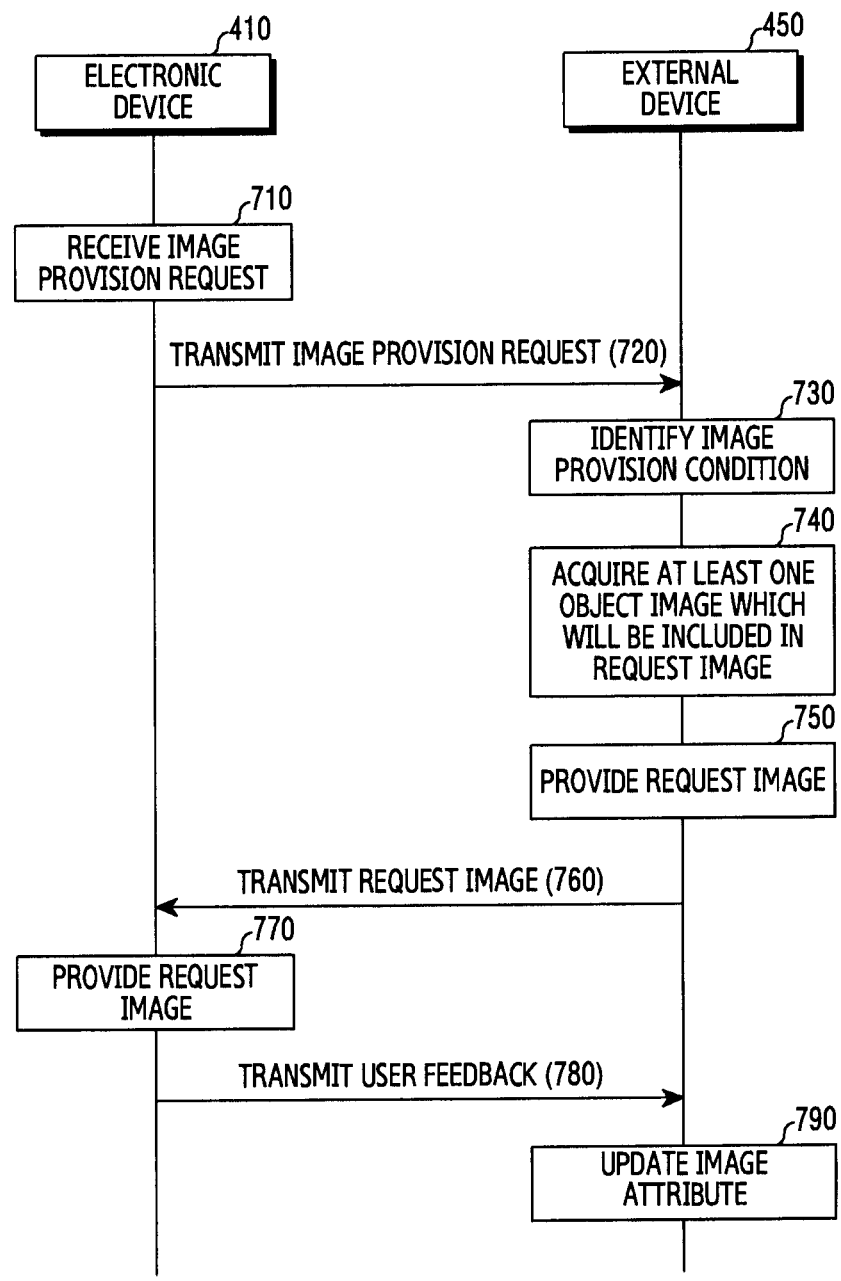
FIG. 7 and FIG. 8 are mutual signal flowcharts of an electronic device and an external device for providing an image meeting an image provision condition according to various embodiments of the present disclosure.

FIG. 7 is a mutual signal flowchart of an electronic device and an external device for providing an image meeting an image provision condition according to various embodiments of the present disclosure.

FIG. 7 illustrates a mutual signal flow that is based on an embodiment in which an operation of providing a request image on the basis of an image provision condition is carried out by the external device 450.

In operation 710, the processor 420 of the electronic device 410 may receive an image provision request through an input module. Operation 710 may correspond to operation 510.

In operation 720, the processor 420 of the electronic device 410 may control the communication module 440 to transmit, to the external device 450, the image provision request received from a user in operation 710.

In operation 730, the processor 420-1 of the external device 450 may identify an image provision condition on the basis of the image provision request received from the electronic device 410 in operation 720.

In operation 740, the processor 420-1 of the external device 450 may acquire at least one object which will be included in a request image.

In an embodiment, the processor 420-1 of the external device 450 may identify a search region of the processor 420-1 of the external device 450 on the basis of an attribute of the object which will be included in the request image. The attribute of the object may be an attribute representing the inclusion or non-inclusion of private information of the user or a figure related to the user. For example, in response to an object associated with an object image which will be included in the request image including the private information of the user or the figure related to the user, the processor 420-1 may search a first region 431 of the memory 430-1.

In an embodiment, the processor 420-1 of the external device 450 may search the identified search region of the memory 430 for an original image including the object which will be included in the request image, and acquire the object image which will be included in the request image on the basis of the searched original image.

In operation 750, the processor 420-1 of the external device 450 may provide the request image. In an embodiment, the processor 420-1 of the external device 450 may provide the request image, by synthesizing the acquired at least one object image in one image.

In operation 760, the processor 420-1 of the external device 450 may transmit the provided request image to the electronic device 410. In an embodiment, in response to failing to provide the request image for the reason in which the original image including the object image which will be included in the request image is not searched, etc., the processor 420-1 of the external device 450 may transmit a message representing a failure of provision of the request image and the cause of the failure, etc.

In an embodiment, the processor 420-1 of the external device 450 may store the provided request image in the memory 430-1.

In an embodiment, instead of transmitting the request image to the electronic device 410, the processor 420-1 of the external device 450 may provide processing information (recipe) wherein the request image may be provided in the electronic device 410, on the basis of recognition of the searched original image, and transmit the provided processing information to the electronic device 410. At this time, the electronic device 410 may provide the request image by using the received processing information.

In an embodiment, instead of transmitting the request image to the electronic device 410, the processor 420-1 of the external device 450 may process a part of the request image, and then transmit the processing result to the electronic device 410. At this time, after processing another part of the request image, the electronic device 410 may combine this with the received result, to provide the final result (i.e., the request image).

In operation 770, the processor 420 of the electronic device 410 may provide the received request image to the user. In an embodiment, the processor 420 of the electronic device 410 may receive a user feedback or evaluation for the provided request image.

In operation 780, the processor 420 of the electronic device 410 may transmit the received user feedback or evaluation to the external device 450.

In operation 790, the processor 420-1 of the external device 450 may update an attribute of an image on the basis of the received user feedback or evaluation. For example, the processor 420-1 of the external device 450 may update an attribute value (e.g., a preference) of an original image of an object image which has been used for provision of the request image, on the basis of the received user feedback.

Figure 8:
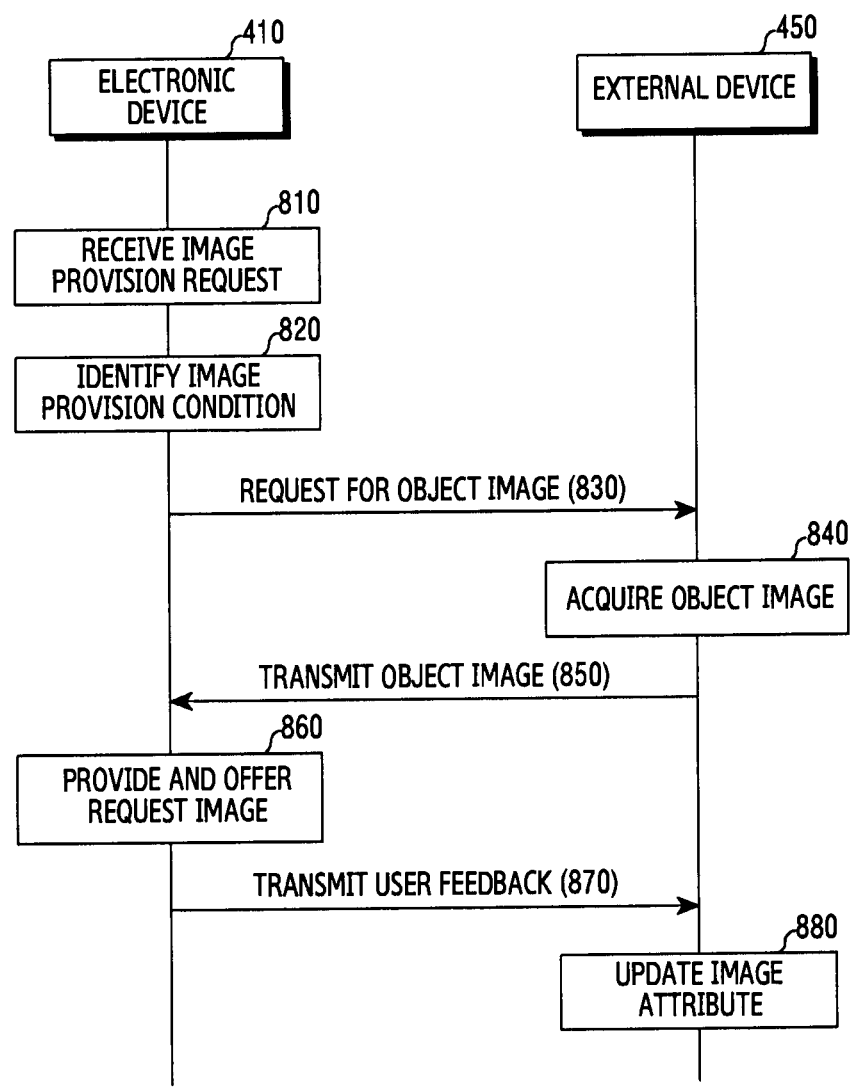

FIG. 8 is a mutual signal flowchart of an electronic device and an external device for providing an image meeting an image provision condition according to various embodiments of the present disclosure.

FIG. 8 illustrates a mutual signal flow that is based on an embodiment in which an operation of providing a request image on the basis of the image provision condition is carried out by the electronic device 410.

In operation 810, the processor 420 of the electronic device 410 may receive an image provision request. For example, the processor 420 of the electronic device 410 may receive a text input such as "I want to look at the photograph in which I went to the Seoul Park with mom when I was on summer vacation of third grade of middle school".

In operation 820, the processor 420 of the electronic device 410 may identify an image provision condition. For example, the processor 420 of the electronic device 410 may identify an image provision condition for an object which will be included in a request image, such as ("the Seoul Park of 1 Jul. 1997~31 Aug. 1997", "I of 1 Jul. 1997~31 Aug. 1997", and "mom of 1 Jul. 1997~31 Aug. 1997"), on the basis of situation information obtained from the image provision request.

In operation 830, the processor 420 of the electronic device 410 may request for an image (object image) of the identified object to the external device 450. Here, the object image requested to the external device 450 may be a portion segmented or cut out from an image (original image) different from the request image.

In an embodiment, the processor 420 of the electronic device 410 may request for the object image, by transmitting data related to the object image request to the external device 450.

As described above, the data related to the object image request may include information about an object and condition information about the object.

In an embodiment, the information about the object may include identification information of the object, and the condition information about the object may include information about various conditions for restricting the object, for example, time information, location information, etc. For example, in operation 830, the electronic device 410 may request for an object image of "mom of 1 Jul. 1997~31 Aug. 1997".

In an embodiment, the processor 420 of the electronic device 410 may search the memory 430 of the electronic device 410, before requesting for an image of an object which will be included in a request image to the external device 450. For example, in response to being capable of searching the memory 430 of the electronic device 410 for the image of the object which will be included in the request image, the processor 420 of the electronic device 410 may not request the image of the object to the external device 450. In another embodiment, in response to the image of the object which will be included in the request image including a first object image and a second object image, and the first object image being capable of being searched from the memory 430 of the electronic device 410, the processor 420 of the electronic device 410 may request only for the second object image to the external device 450.

In operation 840, the processor 420-1 of the external device 450 may acquire the requested object image by searching the memory 430-1 of the external device 450.

In an embodiment, the processor 420-1 of the external device 450 may search the memory 430-1 for an original image. In an embodiment, the processor 420-1 of the external device 450 may acquire the requested object image, by segmenting or cropping the requested object image from the searched original image.

In an embodiment, the memory 430-1 of the external device 450 may include the first region 431 and the second region 432. The processor 420-1 of the external device 450 may identify a region which will be searched, of the memory 430-1 on the basis of information (e.g., identification information of an object) about the object included in data related to an object image request. For example, in response to the external device 450 receiving data requesting for an image of "mom" of "1 Jul. 1997~31 Aug. 1997", the processor 420-1 of the external device 450 may distinguish that an object of a requested image is an object related to private information of a user, and identify the region which will be searched, of the memory 430-1, as the first region 431.

In operation 850, the processor 420-1 of the external device 450 may transmit the acquired object image to the electronic device 410.

In an embodiment, in response to the processor 420-1 of the external device 450 failing to acquire the requested object image in operation 840, the processor 420-1 may transmit a message of notifying a failure to acquire the requested object image despite the searching of the memory 430-1 of the external device 450, to the electronic device 410.

In an embodiment, in response to failing to acquire the requested object image in operation 840, the processor 420-1 of the external device 450 may transmit a message of, although failing to acquire an object image meeting a time condition (first time condition) of an image provision condition, being capable of acquiring an object image meeting a second time condition, to the electronic device 410.

In operation 860, the processor 420 of the electronic device 410 may provide a request image by using the received object image, and provide the provided request image to a user.

In operation 870, the processor 420 of the electronic device 410 may transmit, to the external device 450, a user feedback for the request image displayed in or provided to an output module (e.g., a display) of the electronic device.

In operation 880, the processor 420-1 of the external device 450 may update at least one image attribute on the basis of the received user feedback. In an embodiment, the processor 420-1 of the external device 450 may update an attribute of an original image. For example, in response to the requested object image being segmented or cropped from a first image stored in the memory 430-1 of the external device 450, the processor 420-1 of the external device 450 may control the memory 430-1 of the external device 450 to change a value of an attribute (e.g., an accuracy and a preference) of the first image.

Figure 9A:
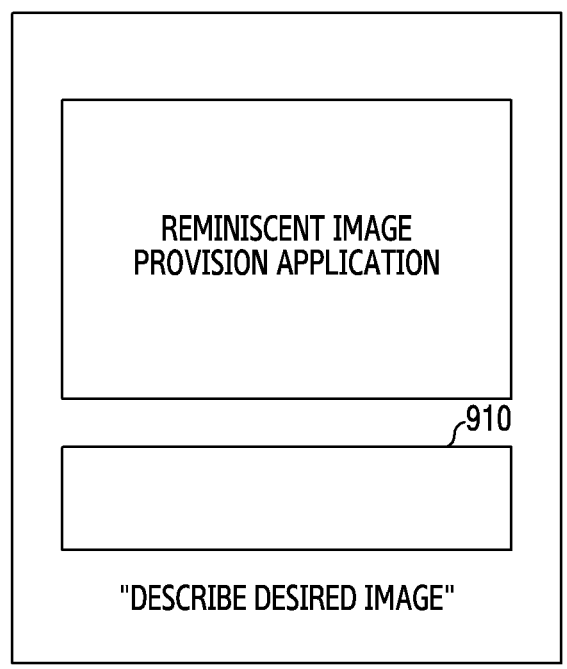
FIG. 9A and FIG. 9B illustrate examples of a user interface for receiving an image provision request according to various embodiments of the present disclosure.
Figure 9B:
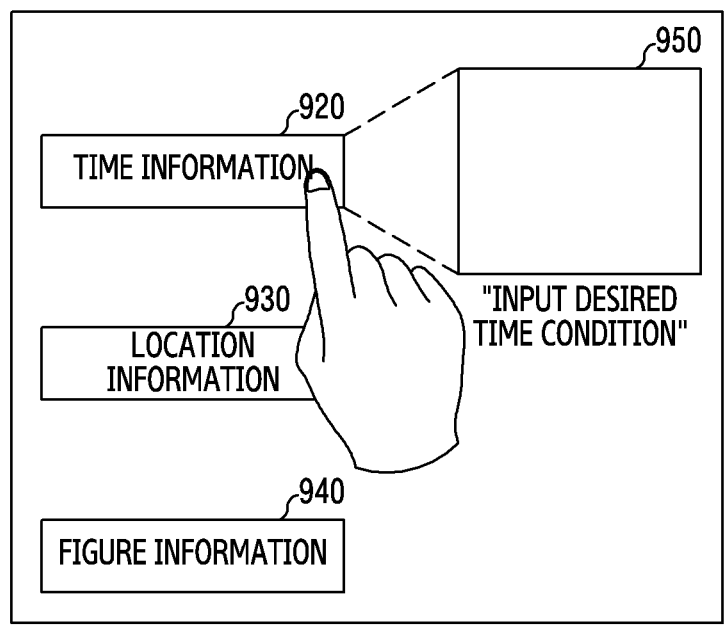

FIG. 9A and FIG. 9B illustrate examples of a user interface for receiving an image provision request according to various embodiments of the present disclosure.

In FIG. 9A, in response to receiving a user input for executing a specific function or application from a user, the electronic device 410 may display, on a screen, a user interface for receiving an image provision request from the user. For example, in response to receiving a user input (e.g., application icon touch) for executing a "reminiscent image creation application", the electronic device 410 may display, on the screen, the user interface for receiving the image provision request from the user.

In an embodiment, the user interface for receiving the image provision request may include one text input window 910. For example, the electronic device 410 may display the one text input window 910 for receiving an image description of a user on the screen, together with a guide phrase "Describe a desired image". At this time, the electronic device 410 may receive the image description of the user such as "I want to look at the photograph in which I went to the Seoul Park with mom when I was on summer vacation of third grade of middle school" through the one text input window 910.

Referring to FIG. 9B, a user interface for receiving an image provision request may include a plurality of menus 920 to 940 each corresponding to situation information. For example, the electronic device 410 may display, on the screen, the menus 920 to 940 corresponding to time information, location information, and figure information. At this time, in response to a user touching the menu 920 corresponding to the time information, the electronic device 410 may display an input window 950 for receiving a user description about the time information and a guide phrase such as "Input a desired time condition", together. At this time, the electronic device 410 may receive a text "summer vacation of third grade of middle school" from the user through the input window 950 for receiving the time information. That is, the electronic device 410 may provide the user interface for exactly receiving each condition of a request image.

Figure 10:
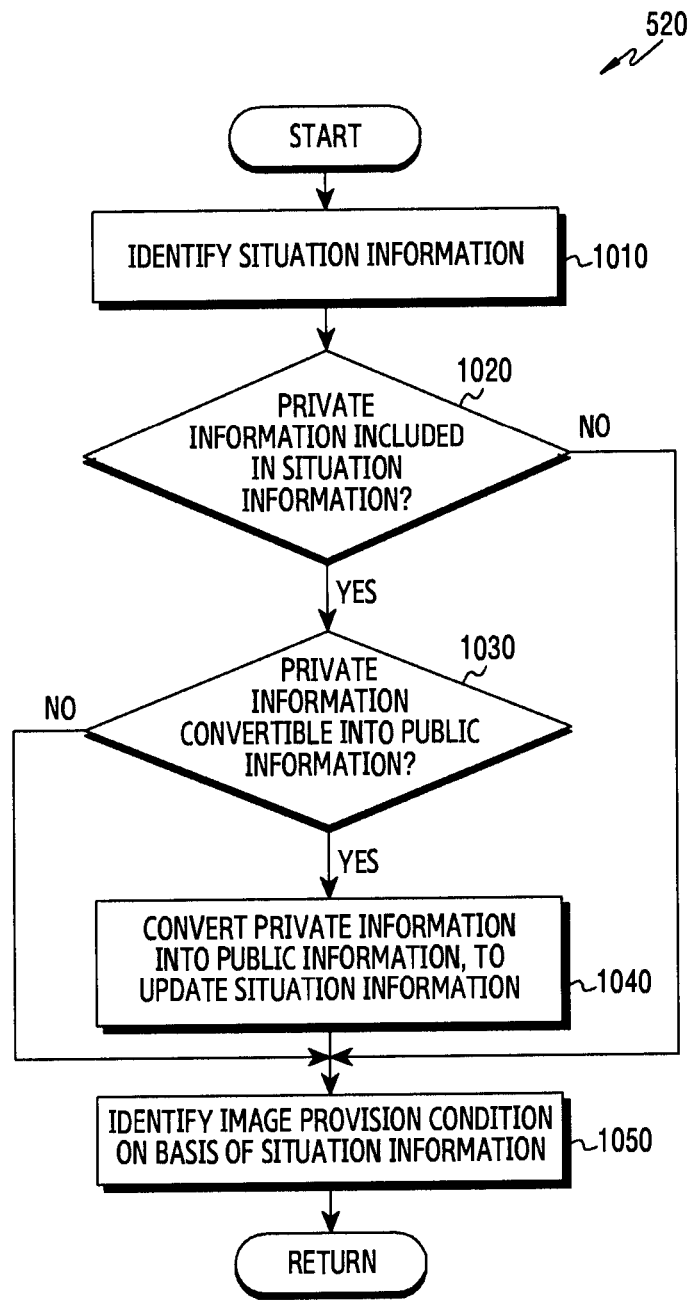
FIG. 10 is a detailed flowchart of an operation for identifying an image provision condition in an electronic device according to various embodiments of the present disclosure.

FIG. 10 is a detailed flowchart of an operation for identifying an image provision condition in an electronic device according to various embodiments of the present disclosure. FIG. 10 may be a detailed flowchart of operation 520 of FIG. 5.

In operation 1010, the processor 420 of the electronic device 410 may identify situation information. In an embodiment, the processor 420 of the electronic device 410 may identify the situation information on the basis of the analysis result of an image provision request. In an embodiment, the image provision request may be received from a user before operation 1010 is performed. In an embodiment, the image provision request may be received from the user through one of various user interfaces disclosed in FIG. 9A or FIG. 9B.

In an embodiment, the situation information may be information expressing various information capable of restricting an image, through a plurality of items and attribute values corresponding to them. For example, the situation information may include at least one of time information, location information, weather information, object information (e.g., figure information), and background information. In an embodiment, the time information may be information related to time among information included in the image provision request. Here, the information related to the time may be information related to an age of an object which will be included in an image, or a photographing time.

In an embodiment, the electronic device 410 may receive the image provision request through the user interface disclosed in FIG. 9A. For example, when referring to FIG. 11, the electronic device 410 may receive, as the image provision request, a text input 1110 ("I want to loot at the photograph in which I went to the Seoul Park with mom when I was on summer vacation of third grade of middle school") of a user through the user interface disclosed in FIG. 9A.

In an embodiment, in response to the electronic device 410 receiving an image provision request through the user interface disclosed in FIG. 9A, the processor 420 of the electronic device 410 may utilize a separate analysis result such as natural language analysis or machine learning, etc. in order to identify situation information in the image provision request. For example, the processor 420 of the electronic device 410 may identify situation information 1120 including time information and two pieces of object information, from the image provision request 1110, by using a separate analysis result such as natural language analysis or machine learning, etc.

In an embodiment, in response to the electronic device 410 receiving an image provision request through the user interface disclosed in FIG. 9B, the processor 420 of the electronic device 410 may identify situation information including time information and object information, on the basis of a user input inputted to each menu and a corresponding input window. For example, the processor 420 of the electronic device 410 may identify a user input (e.g., summer vacation of third grade of middle school) inputted to the input window 950 corresponding to the time information, as an attribute value of the time information.

In operation 1020, the processor 420 of the electronic device 410 may identify whether private information is included in the identified situation information. In an embodiment, the private information may mean information restricted only for a specified figure, or information whose meaning depends on who a user is.

In response to it being identified that the private information is not included in the identified situation information, in operation 1050, the processor 420 of the electronic device 410 may identify an image provision condition on the basis of the situation information. In an embodiment, the image provision condition may be a collection of the identified all situation information. In another embodiment, the image provision condition may be information converting the identified situation information with a criterion of an object.

In response to it being identified that the private information is not included in the identified situation information, in operation 1050, the processor 420 of the electronic device 410 may identify an image provision condition on the basis of the situation information. In an embodiment, the image provision condition may be a collection of the identified all situation information. In another embodiment, the image provision condition may be information converting the identified situation information with a criterion of an object.

Figure 11:
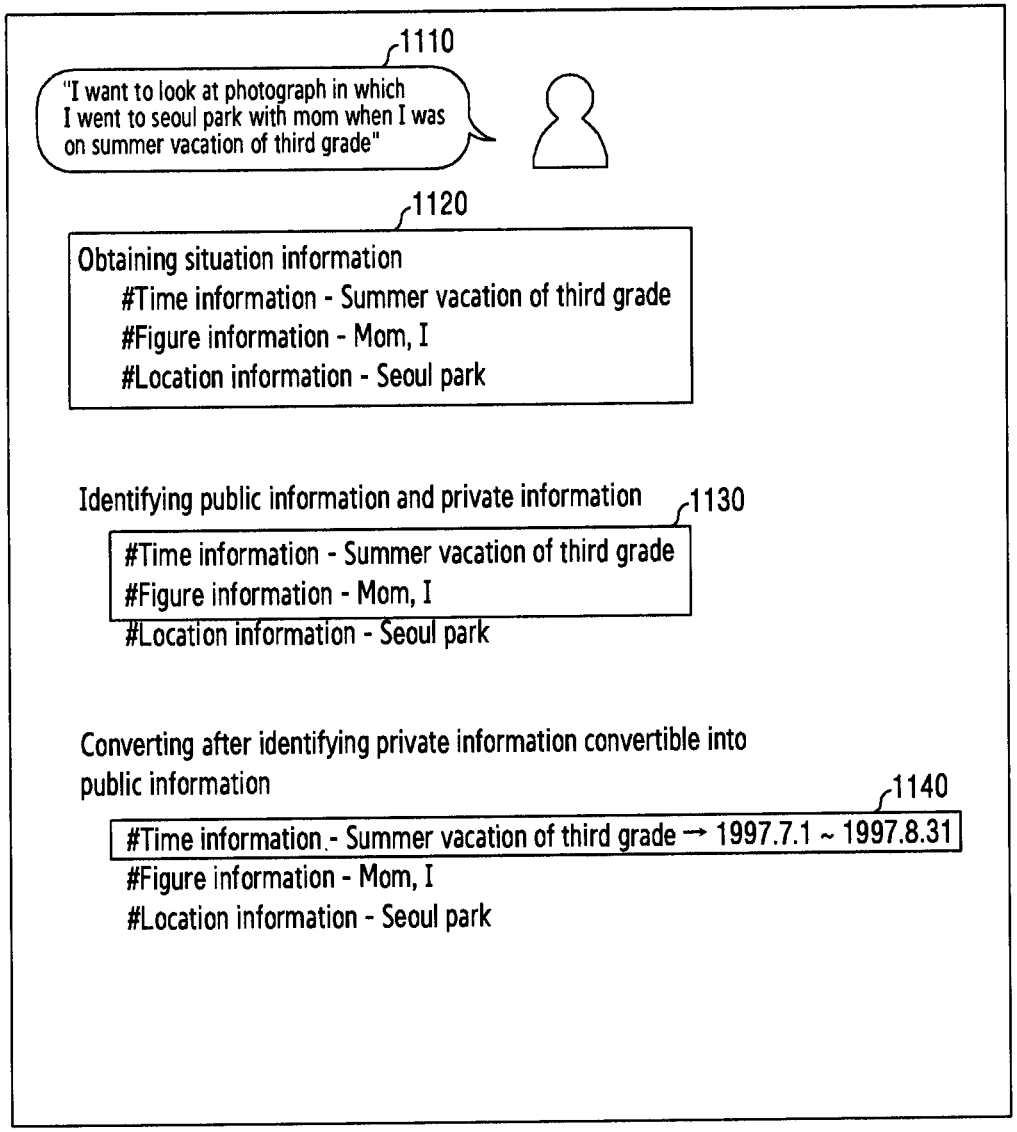
FIG. 11 illustrates an example of identifying an image provision condition on the basis of an image provision request according to various embodiments of the present disclosure.

In response to it being identified that the private information is included in the situation information, in operation 1030, the processor 420 of the electronic device 410 may convert at least partial private information into information (hereinafter, referred to as "public information") not including the private information. Referring to FIG. 11, the processor 420 of the electronic device 410 may convert at least part 1140 of private information 1130 among the situation information 1120.

In an embodiment, at least partial situation information including private information may be converted into public information on the basis of a user profile stored in the memory 430.

In an embodiment, the processor 420 of the electronic device 410 may not convert even the situation information including the private information, into the public information. For example, the processor 420 of the electronic device 410 may not convert figure information (e.g., a face image of a user or a figure related to the user) into public information. The reason is that, in response to converting the figure information, which is information having to be necessarily included in an image (request image) intended to be provided by the user, into the public information (e.g., mosaic processing), it is difficult to say that the image desired by the user is provided.

In an embodiment, the processor 420 of the electronic device 410 may update situation information by converting at least partial situation information including private information into public information. For example, the processor 420 of the electronic device 410 may convert the time information 1140 (summer vacation of third grade) including private information into public information (1 Jul. 1997~31 Aug. 1997).

In operation 1050, the processor 420 of the electronic device 410 may identify an image provision condition on the basis of the updated situation information. For example, the processor 420 of the electronic device 410 may identify the updated situation information as the image provision condition.

By performing the above-mentioned operations in order mentioned above, the electronic device 410 may identify an image provision condition on the basis of an image provision request received from a user. In another embodiment, the external device 450 may identify an image provision condition on the basis of an image provision request received from the electronic device 410 as well. At this time, a user profile used to convert at least partial situation information including private information into public information may have been stored in the first region 431 of the memory 430-1 of the external device 450.

Figure 12:
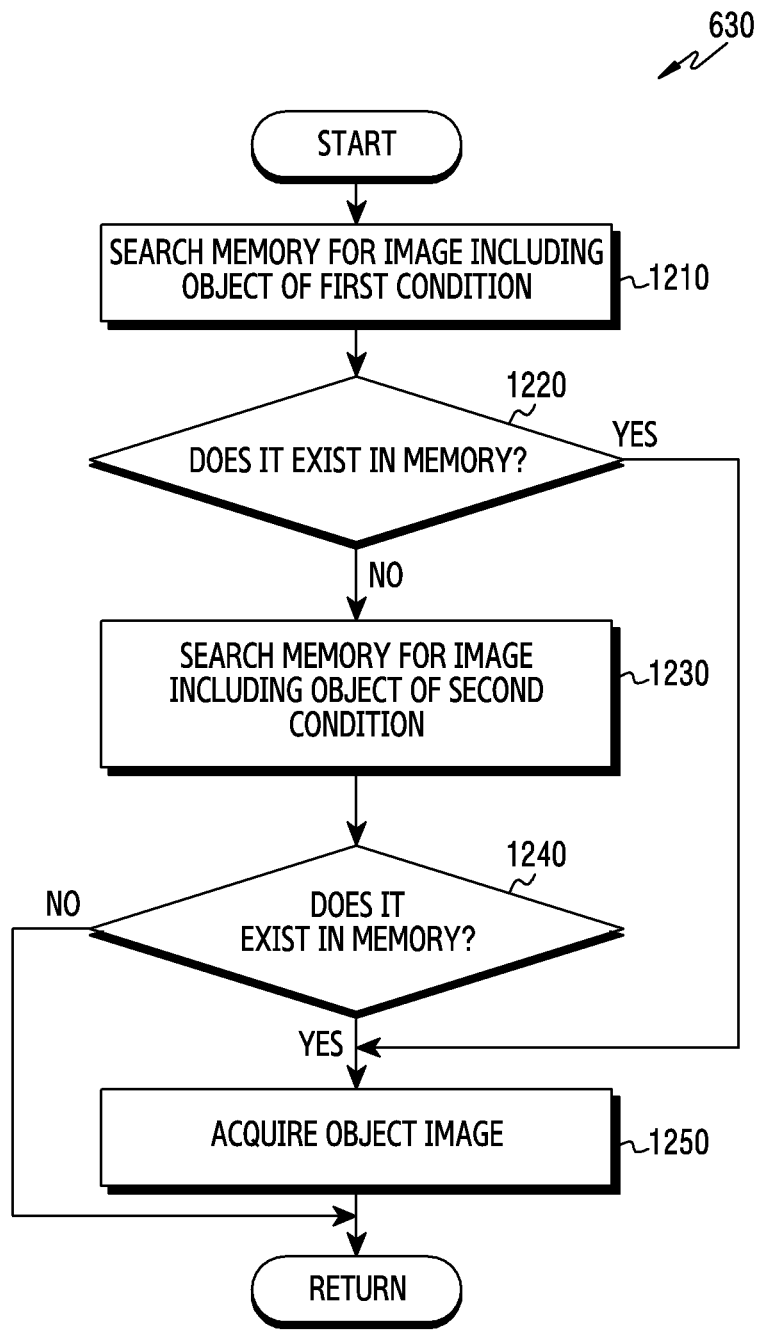
FIG. 12 is a detailed flowchart of an operation for acquiring an object image which will be included in a request image in an electronic device according to various embodiments of the present disclosure.

FIG. 12 is a detailed flowchart of an operation for acquiring an object image which will be included in a request image in an electronic device according to various embodiments of the present disclosure. FIG. 12 may be a detailed flowchart of operation 630 of FIG. 6.

In operation 1210, the processor 420 of the electronic device 410 may search the memory 430 of the electronic device 410 for an original image including an object of a first condition, or transmit a search request for the original image including the object of the first condition to the external device 450. In an embodiment, the first condition may be a condition included in an image provision condition. For example, the processor 420 of the electronic device 410 may search the memory 430 of the electronic device 410 for an original image including an object (e.g., "mom of 1 Jul. 1997~31 Aug. 1997") of the first condition included in the image provision condition.

In operation 1220, the processor 420 of the electronic device 410 may distinguish whether the original image including the object of the first condition exists in the memory 430 of the electronic device 410 or the memory 430-1 of the external device 450. In response to distinguishing that the original image including the object of the first condition does not exist in the memory 430 of the electronic device 410 or the memory 430-1 of the external device 450, in operation 1230, the processor 420 of the electronic device 410 may search the memory 430 of the electronic device 410 or the memory 430-1 of the external device 450 for an original image including an object of a second condition. In response to distinguishing that the original image including the object of the first condition exists in the memory 430 of the electronic device 410 or the memory 430-1 of the external device 450, in operation 1250, the processor 420 of the electronic device 410 may acquire an object image of the first condition, by acquiring the original image and segmenting or cropping the object image from the acquired original image.

In an embodiment, the second condition may include the first condition, and the object of the first condition and the object of the second condition may represent the same entity. For example, the object of the first condition may be "mom of 1 Jul. 1997~31 Aug. 1997", and the object of the second condition may be "mom of 1 Jul. 1996~31 Aug. 1998". That is, in response to not being capable of acquiring an object image of a specific condition of the image provision condition, an object not fully matched with but associated with a condition proposed by a user (or of a similar condition) may be acquired by relaxing the specific condition.

In an embodiment, the second condition may be identified according to an attribute of an object. In an embodiment, the attribute of the object may be an attribute representing a sensitivity to time. For example, in response to the object being "the Seoul Park", and the first condition being associated with a time interval "1 Jul. 1997~31 Aug. 1997", the processor 420 of the electronic device 410 may identify the second condition as a relatively wide time interval (1 Jul. 1996~31 Aug. 1998), in consideration that the object is a lifeless thing whose variation is not large with respect to time. For example, in response to the object being "mom", and the first condition being associated with a time interval "1 Jul. 1997~31 Aug. 1997", the processor 420 of the electronic device 410 may identify the second condition as a relatively narrow time interval (1 May 1997~31 Oct. 1997), in consideration that the object is a living thing whose variation is large with respect to time.

In operation 1240, the processor 420 of the electronic device 410 may distinguish whether the original image including the object of the second condition exists in the memory 430 of the electronic device 410 or the memory 430-1 of the external device 450. In response to distinguishing that the original image including the object of the second condition exists in the memory 430 of the electronic device 410 or the memory 430-1 of the external device 450, in operation 1250, the processor 420 of the electronic device 410 may acquire an object image of the second condition, by acquiring the original image including the object of the second condition and segmenting or cropping the object image from the acquired original image.

Though not illustrated, in response to it being distinguished that the original image including the object of the second condition does not exist in the memory 430 of the electronic device 410 or the memory 430-1 of the external device 450, the processor 420 of the electronic device 410 may provide a user with a notification of content in which a request image corresponding to an image provision request may not be provided. The notification of content in which the request image may not be provided may include the reason of not being capable of providing the request image. For example, because the processor 420 is not able to acquire an original image including "mom of 1 Jul. 1997~31 Aug. 1997", the processor 420 may provide the user with a notification of content in which a request image may not be provided.

Figure 13:
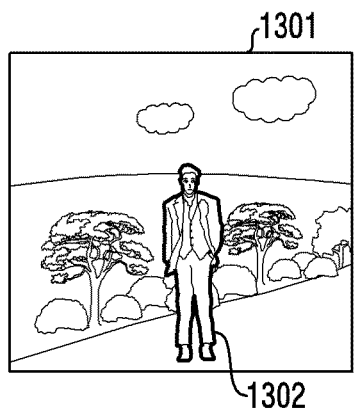
FIG. 13 illustrates an image stored in a first region of a memory and image information according to various embodiments of the present disclosure.

FIG. 13 illustrates an image stored in a first region of a memory, and image information according to various embodiments of the present disclosure.

In an embodiment, the first region 431 of the memory 430-1 may store data associated with private information of a specified person. For example, the first region 431 of the memory 430-1 may store an image of a user or a figure (e.g., a family or friend of the user) related to the user, and image information, together. At this time, the image information may include at least one of information such as a photographing time, a photographing location, etc. capable of being identified from metadata of the image, information such as object information, etc. capable of being acquired by analyzing the image, and information such as an accuracy, a preference, etc. capable of being acquired through additional information of the user.

In an embodiment, the first region 431 of the memory 430-1 may be segmented into a plurality of regions, and each category may be specified to a user or a figure (e.g., mom) associated with the user.

In an embodiment, the first region 431 of the memory 430-1 may be a storage space specified to a specified person (e.g., a user).

In an embodiment, as long as the specified person does not agree, the first region 431 of the memory 430-1 may not be granted for access of an image provision request of a person different from the specified person.

One image 1301 stored in the first region 431 of the memory 430-1 is exemplified. The image 1301 may include a plurality of objects which include a user or a FIG. 1302 related to the user.

Information 1303 of the image 1301 is exemplified. The information 1303 of the image 1301 may include a plurality of attributes and attributes corresponding to them. The plurality of items may include a time 1310, a location 1320, an accuracy 1330, object information 1340, weather 1350, a time sensitivity 1360, a preference 1370, purpose information 1380, upload information 1390, etc. Each item may correspond to each attribute value.

In an embodiment, the information 1303 of the image 1301 may be provided by a user as well, and otherwise, may be distinguished by the external device 450 on the basis of metadata of the image or a machine learning result as well.

In an embodiment, the time 1310, the location 1320, the weather 1350, and the purpose information 1380 may correspond to information about a time at which the image 1301 is photographed, a location, weather, and a photographing purpose (e.g., travel, etc.), respectively.

In an embodiment, the accuracy 1330 may correspond to information representing how accurate the object information 1340 is.

In an embodiment, the object information 1340 may correspond to information representing who the object 1302 included in the image 1301 is, or which relationship with a user the object 1302 has. For example, the object information 1340 may correspond to identification information (identifier C) representing who the object 1302 included in the image 1301 is.

In an embodiment, the preference 1370 may correspond to information representing how much the user is satisfied when a request image is synthesized by using the image 1301.

In an embodiment, the upload information 1390 may correspond to information representing how the image 1301 has been stored in the first memory 431 of the memory 430-1.

Figure 14:
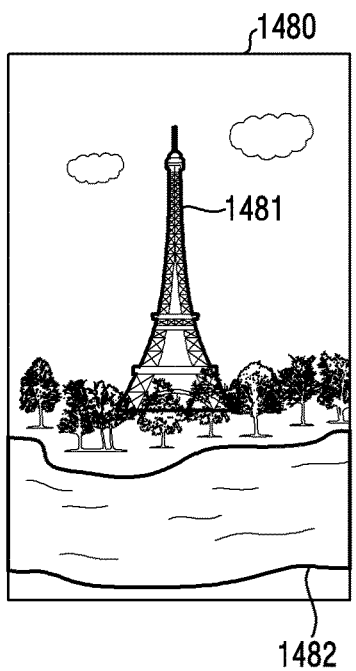
FIG. 14 illustrates an image stored in a second region of a memory and image information according to various embodiments of the present disclosure.

FIG. 14 illustrates an image stored in a second region of a memory, and image information according to various embodiments of the present disclosure.

In an embodiment, the second region 432 of the memory 430-1 may store data irrelevant to private information of a specified person. For example, the second region 432 of the memory 430-1 may store an image of facility (e.g., commercial facility, public facility, etc.) and image information, together. At this time, the image information may include at least one of information such as a photographing time, a photographing location, etc. capable of being identified from metadata of the image, and information such as an accuracy, a preference, etc. capable of being obtained through additional information of a user.

In an embodiment, one image 1480 stored in the second region 432 of the memory 430-1 is exemplified. The image 1480 may include a plurality of objects 1481 and 1482 irrelevant to a user or a figure related to the user.

In an embodiment, information 1483 of the image 1480 is exemplified. The information 1483 of the image 1480 may include a plurality of items and attribute values corresponding to them. The items included in the information 1483 may be items which are the same as or are different from the items included in the information 1303 disclosed in FIG. 13. For example, a time 1410, a location 1420, an accuracy 1430, object information 1440, weather 1450, a time accuracy 1460, upload information 1470, etc. may be the same as the items included in the information 1303.

Some items among the items included in the information 1303 of the image 1301 disclosed in FIG. 13 may not be included in the information 1483 of the image 1480. For example, the purpose information 1380 may not be included in the information 1483.

Figure 15:
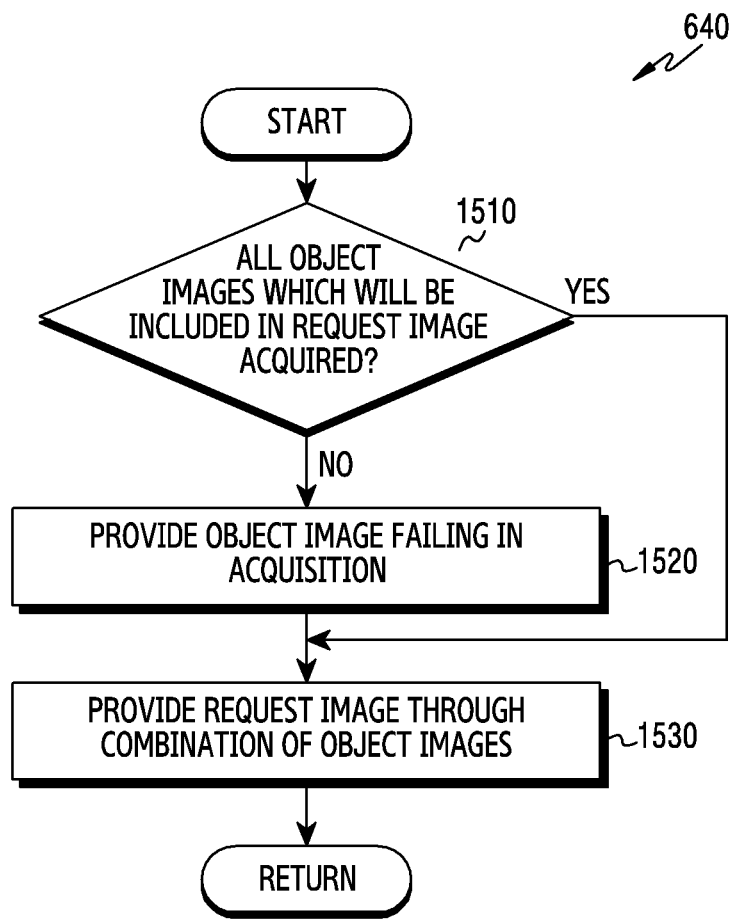
FIG. 15 is a detailed flowchart of an operation for providing a request image in an electronic device according to various embodiments of the present disclosure.

FIG. 15 is a detailed flowchart of an operation for providing a request image in an electronic device according to various embodiments of the present disclosure. FIG. 15 may be a detailed flowchart of operation 640 of FIG. 6.

In operation 1510, the processor 420 of the electronic device 410 may distinguish whether it has acquired all object images which will be included in a request image. In an embodiment, the processor 420 of the electronic device 410 may distinguish whether it has acquired the all object images which will be included in the request image, through at least any one of a search of the memory 430 of the electronic device 410 or a request to the external device 450. For example, in response to the all object images which will be included in the request image being a first object image and a second object image, and the first object image being acquired through the search of the memory 430 of the electronic device 420, and the second object image being requested to the external device 450 and then the requested second object image being acquired from the external device 450, the processor 420 of the electronic device 410 may distinguish that it has acquired the all object images which will be included in the request image.

In response to distinguishing that it fails to acquire the all object images which will be included in the request image in operation 1510, in operation 1520, the processor 420 of the electronic device 410 may provide an object image failing in acquisition. For example, in response to distinguishing that it fails to acquire the first object image (or, in response to failing to search for an original image including the first object image), the processor 420 of the electronic device 410 may directly provide the first object image. For example, the processor 420 of the electronic device 410 may provide the first object image by using a vector drawing technique. For another example, the processor 420 of the electronic device 410 may directly provide the first object by using a machine learning technique.

In an embodiment, the processor 420 of the electronic device 410 may provide an object image failing in acquisition, by interpolating the existing images stored in the memory 430 as well. Detailed content is described later in FIG. 16.

In response to distinguishing that the all object images which will be included in the request image are acquired in operation 1510, or in response to providing the object image failing in acquisition in operation 1520, in operation 1530, the processor 420 of the electronic device 410 may provide a request image by using the acquired (or provided) object images.

In an embodiment, the processor 420 of the electronic device 410 may provide the request image by synthesizing (or combining) the acquired (or provided) object images.

In an embodiment, the processor 420 of the electronic device 410 may synthesize the acquired (or provided) object images by disposing or configuring the acquired (or provided) object images in mutually different positions of one image. For example, the processor 420 of the electronic device 410 may dispose the first object image ("I of 20 Jul. 1997") at a lower portion within an image wherein the first object is seen ahead of the second object, and dispose the second object image ("the Seoul Park of 1 Aug. 1997") at an upper portion within the same image wherein the first object is seen ahead of the second object.

In another embodiment, the processor 420 of the electronic device 410 may dispose the acquired objects images wherein one object image among the acquired (or provided) object images is overlaid on another object image as well.

Figure 16:
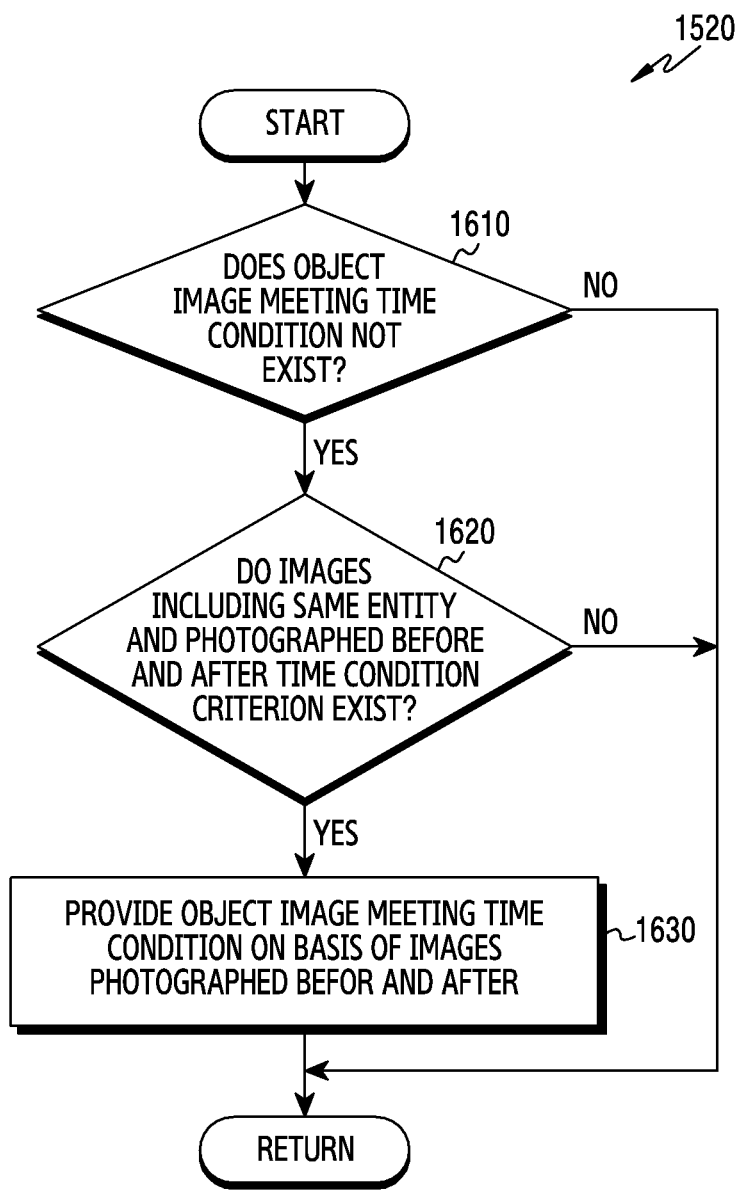
FIG. 16 is a detailed flowchart of an operation for providing an object image failing in acquisition in an electronic device according to various embodiments of the present disclosure.

FIG. 16 is a detailed flowchart of an operation for providing an object image failing in acquisition in an electronic device according to various embodiments of the present disclosure. FIG. 16 may be a detailed flowchart of operation 1520 of FIG. 15.

In operation 1610, the processor 420 of the electronic device 410 may identify whether an object image meeting a time condition does not exist. In other words, in response to there being an object image failing in acquisition, the processor 420 of the electronic device 410 may identify the reason of failing in acquisition. For example, in response to an image provision condition being "mom of 1 Jul. 1997~31 Aug. 1997", the processor 420 of the electronic device 410 may identify whether an image including an object image representing "mom" is not searched regardless of a time condition, or whether the image including the object image representing "mom" is searched but is not matched with the time condition. A process of identifying whether the object meeting the time condition does not exist by the processor 420 of the electronic device 410 in operation 1610 may mean the second example among the above-mentioned two examples.

In response to it being identified that the object image meeting the time condition does not exist in operation 1610, in operation 1620, the processor 420 of the electronic device 410 may identify whether images representing the same entity and photographed before and after with a criterion of the time condition exist in the memory 430 or the memory 430-1. For example, in response to not being capable of searching the object image representing "mom of 1 Jul. 1997~31 Aug. 1997", the processor 420 of the electronic device 410 may identify that an object image representing "mom of 4 Mar. 1989" and an object image representing "mom of 29 Aug. 2001" exist in the memory 430 of the electronic device 410.

In an embodiment, the processor 420 of the electronic device 410 may identify whether the images photographed before and after exist, by searching the memory 430 of the electronic device 410 or additionally making a search request for the memory 430-1 of the external device 450 to the external device 450.

In another embodiment, the processor 420 of the electronic device 410 may receive information about whether the images photographed before and after exist, through the process 860 of receiving the object image from the external device 450 before providing the request image, as well.

In response to it being distinguished that the images photographed before and after exist, in operation 1630, the processor 420 of the electronic device 410 may provide the object image meeting the time condition on the basis of the images photographed before and after.

In an embodiment, the processor 420 of the electronic device 410 may provide the object image meeting the time condition, by interpolating the images photographed before and after. For example, the processor 420 of the electronic device 410 may identify an image change of a figure dependent on growth or aging within a specific time interval, on the basis of a change of an object image representing "mom of 4 Mar. 1989" and an object image representing "mom of 29 Aug. 2001". And, the processor 420 of the electronic device 410 may estimate and provide an image of a figure at a specific time or time interval (e.g., 1 Jul. 1997~31 Aug. 1997) included in a specific time interval.

Though not illustrated, the processor 420 of the electronic device 410 may provide an object image meeting a time condition, by using one image among images photographed before and after. In an embodiment, the processor 420 of the electronic device 410 may previously store information about a general aging (or growth) pattern variation of a human face, and provide an object image meeting a time condition by using one image among the images photographed before and after. For example, the processor 420 of the electronic device 410 may estimate and provide an object image representing "mom of 1 Jul. 1997~31 Aug. 1997", on the basis of the object image representing "mom of 4 Mar. 1983" and the general aging pattern variation information of the human face.

Though not illustrated, in operation 1630, the processor 420 of the electronic device 410 may provide an object image meeting a time condition, by using at least two or more images photographed at a time different from a time condition. That is, the processor 420 may provide the object image meeting the time condition by using at least two or more images photographed before with a criterion of the time condition, or by using at least two or more images photographed after with a criterion of the time condition. For example, the processor 420 may acquire an object image representing "mom of 10 Jun. 1991" and an object image representing "mom of 20 Jan. 1995", and identify an image change of a figure dependent on a flow of time, by using the acquired object images. And, the processor 420 may estimate and provide an image of mom at a specific time or time interval (e.g., 1 Jul. 1997~31 Aug. 1997), on the basis of the identified image change of the figure.

Figure 17:
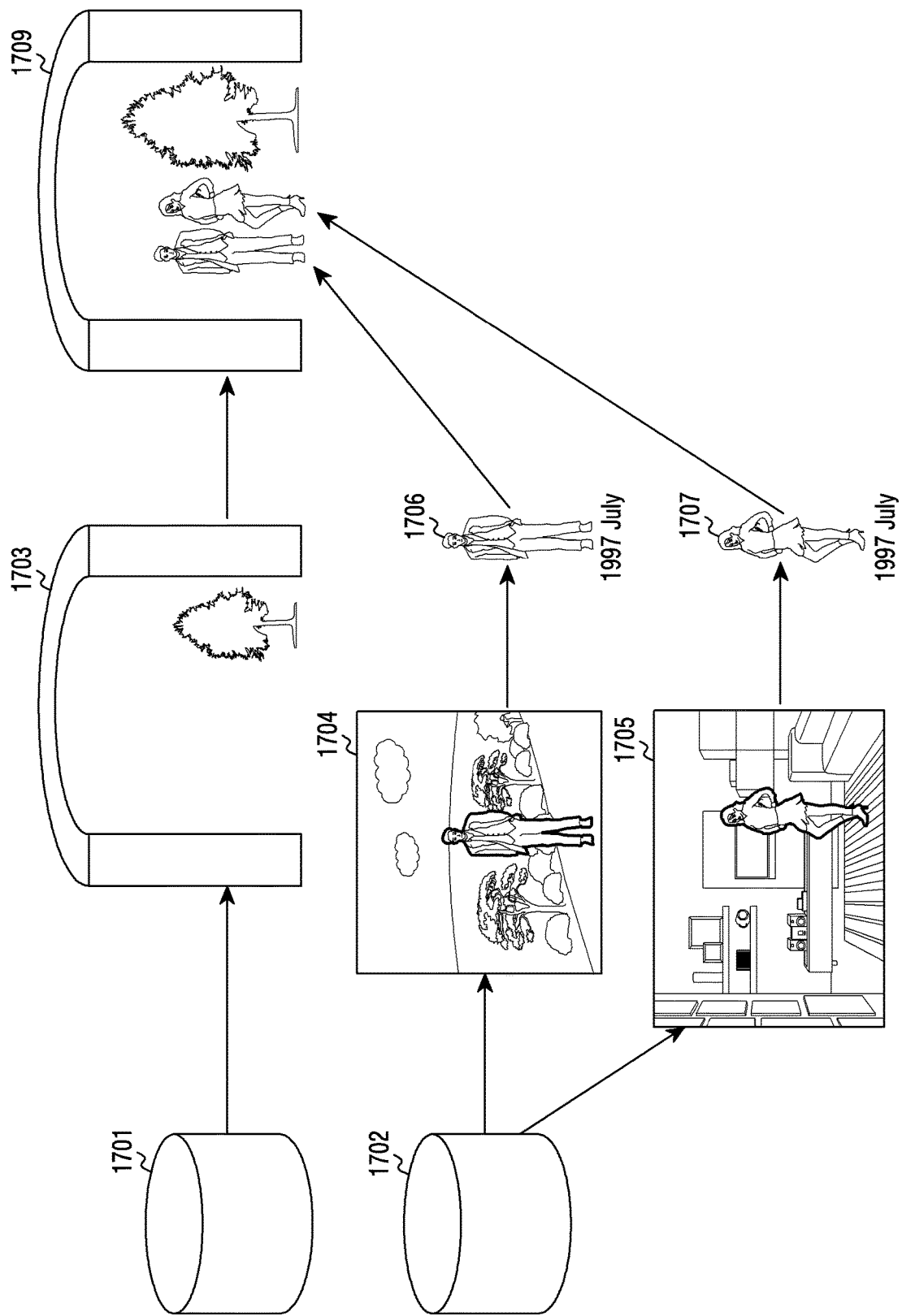
FIG. 17 illustrates one example of providing a request image in an electronic device according to various embodiments of the present disclosure.

FIG. 17 illustrates one example of providing a request image according to various embodiments of the present disclosure. An embodiment disclosed in FIG. 17 may be performed in the electronic device 410 or the external device 450, but a description will be made in which the embodiment disclosed in FIG. 17 below is performed in the external device 450 for description convenience's sake.

The processor 420-1 of the external device 450 may search the memory 430-1 for an original image 1703 including an object image which will be included in a request image. The memory 430-1 may include a first region 1702 and a second region 1701. The first region 1702 may correspond to the first region 431, and the second region 1701 may correspond to the second region 432.

In an embodiment, the processor 420-1 may search the first region 1702 of the memory 430-1 for two original images 1704 and 1705 including an object related to private information, and search the second region 1701 of the memory 430-1 for the original image 1703 including an object irrelevant to the private information.

The processor 420-1 of the external device 450 may acquire an object image which will be included in a request image, on the basis of the searched original image. In an embodiment, an operation of acquiring the object image which will be included in the request image may include an operation of acquiring the object image which will be included in the request image, by segmenting or cropping the original image. For example, the processor 420-1 of the external device 450 may acquire an object image 1707 representing "mom of July 1997" which will be included in the request image and an object image 1706 representing "I of July 1997" which will be included in the request image, from the respective original images 1704 and 1705 searched from the first region 1702 of the memory 430-1.

In an embodiment, the object image which will be included in the request image may mean the whole searched original image as well. For example, the object image which will be included in the request image may mean the original image 1703 itself searched from the second region 1701 of the memory 430 as well.

The processor 420-1 of the external device 450 may provide a request image 1709 by using the acquired objects images.

In an embodiment, the processor 420-1 may provide the request image, by disposing or configuring each of the acquired all objects images in mutually different positions of one image. For example, the processor 420-1 of the external device 450 may dispose the object images 1706 and 1707 indicating figures, at a lower portion within one image in parallel.

In another embodiment, the processor 420-1 may provide the request image, by disposing the acquired objects images to overlay one object image among the acquired objects images on another object image. For example, the processor 420-1 of the external device 450 may provide the request image, by disposing object images indicating figures to overlay with one original image indicating a background.

Figure 18:
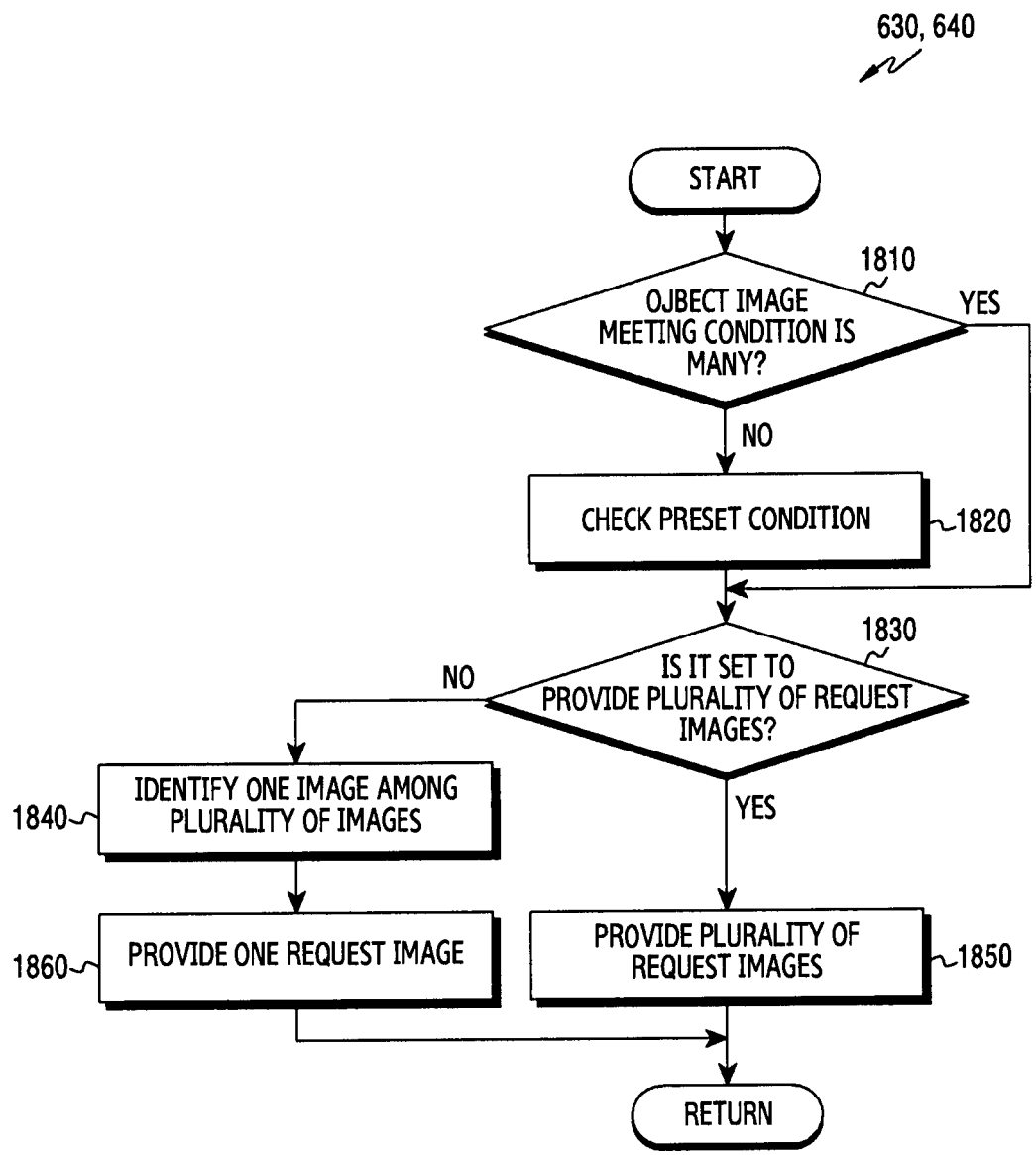
FIG. 18 is a detailed flowchart of an operation for providing a request image in an electronic device according to various embodiments of the present disclosure.

FIG. 18 is a detailed flowchart of an operation for providing a request image in an electronic device according to various embodiments of the present disclosure. FIG. 18 may be a detailed flowchart of operation 630 and operation 640 of FIG. 6.

In operation 1810, the processor 420 of the electronic device 410 may distinguish whether an original image including an object meeting a condition is many. For example, in response to an image provision condition including object (e.g., mom of 1 Jul. 1997~31 Aug. 1997) information of a first condition, the processor 420 may search the memory 430 of the electronic device 410 for an original image including an object meeting the first condition, and as a result, may search a plurality of original images including the object meeting the first condition.

In operation 1820, the processor 420 of the electronic device 410 may identify a preset condition. In an embodiment, the preset condition may be setting about how to, in response to a plurality of original images being searched for one object, process the searched plurality of original images.

In operation 1830, the processor 420 of the electronic device 410 may identify whether it has been set to provide a plurality of request images.

In response to it having been set to provide the plurality of request images, in operation 1850, the processor 420 of the electronic device 410 may provide a plurality of request images by using the plurality of original images. For example, in response to an object image which will be included in a request image including a first object image and a second object image, and a plurality of original images including the first object image being searched, and one original image including the second object image being searched, the processor 420 of the electronic device 410 may provide the plurality of request images by using the each first object image acquired from each of the plurality of original images including the first object image and the second object image acquired from the original image including the second object image.

In response to it having not been set to provide the plurality of request images, in operation 1840, the processor 420 of the electronic device 410 may identify one original image among the plurality of original images. In an embodiment, the processor 420 of the electronic device 410 may identify one original image on the basis of attributes (e.g., accuracies, preferences, etc.) of the plurality of original images or randomly. For example, the processor 420 of the electronic device 410 may identify the original image having the highest preference among the plurality of the original images.

In operation 1860, the processor 420 of the electronic device 410 may provide one request image. For example, in response to an object image which will be included in a request image including a first object image and a second object image, and a plurality of original images including the first object image being searched, and one original image including the second object image being searched, the processor 420 may provide one request image by using one original image identified among the plurality of the original images including the first object image and the one original image including the second object image.

Figure 19:
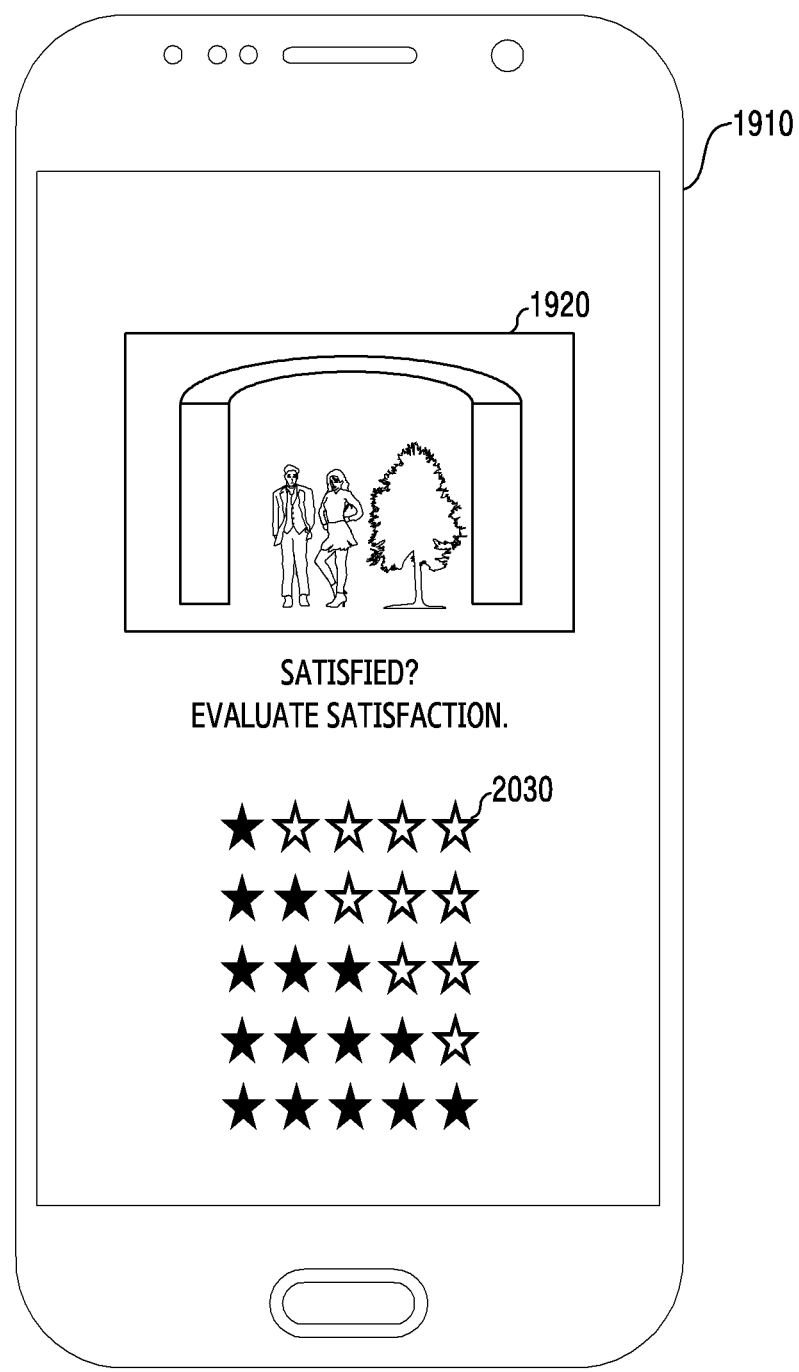
FIG. 19 exemplifies a user interface for receiving a user feedback according to various embodiments of the present disclosure.

FIG. 19 exemplifies a user interface for receiving a user feedback according to various embodiments of the present disclosure.

Referring to FIG. 19, the electronic device 1910 may be the electronic device 410.

In an embodiment, the processor 420 of the electronic device 1910 may provide a user with a request image provided by the electronic device 1910 or a request image provided by the external device 450. For example, the processor 420 of the electronic device 1910 may control a display to display a request image 1920 on a screen. At this time, the processor 420 of the electronic device 1910 may control the display to display an additional message as well. For example, the display of the electronic device 1910 may display a message "Estimate a satisfaction" beneath the request image 1920 displayed on the screen.

In an embodiment, the processor 420 of the electronic device 1910 may provide a user interface for receiving a user feedback (e.g., stars) about the request image, together with the request image 1920. For example, the processor 420 of the electronic device 1910 may provide a user interface 2030 for receiving star information about the request image 1920, together with the request image 1920.

In an embodiment, the processor 420 may identify a satisfaction (e.g., the preference 1370 of FIG. 13) of an original image used to provide the request image 1920. For example, the processor 420 may identify the satisfaction of the original image used to provide the request image 1920, on the basis of user feedback information about the request image 1920, and store (or update) the identified satisfaction information in the memory 430.

Though not illustrated, the processor 420 may provide a user interface for receiving a user feedback for each of object images included in a request image. The processor 420 may identify a satisfaction of an original image used to provide the request image 1920, on the basis of a user input to the provided user interface.

Figure 20:
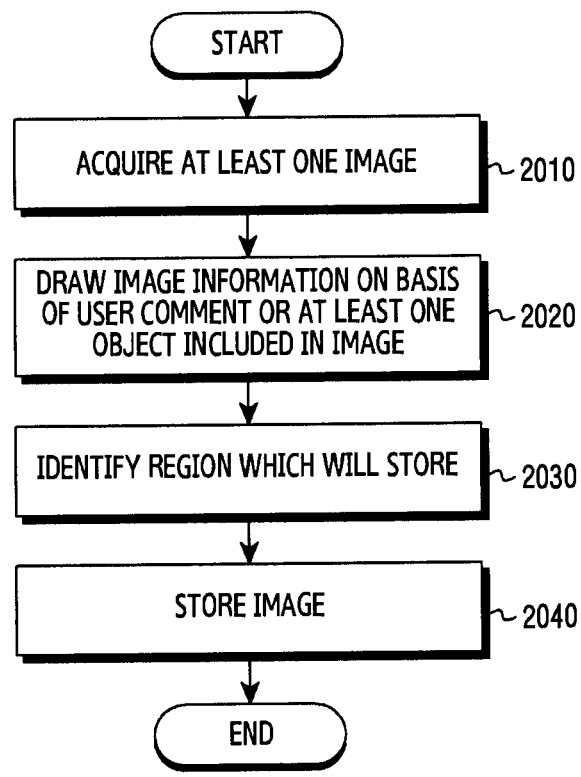
FIG. 20 is a flowchart of an operation of storing an acquired image in a memory in an external device according to various embodiments of the present disclosure.

FIG. 20 is a flowchart of an operation of storing an acquired image in a memory in an external device according to various embodiments of the present disclosure. Operations of FIG. 20 may mean a part of a process of building a database in the memory 430-1 of the external device 450.

In operation 2010, the processor 420-1 of the external device 450 may acquire one or more images. For example, the external device 450 may acquire one or more images through at least one of a social network service (SNS), an Internet bulletin, a messenger, a blog, and a media platform In operation 2020, the processor 420-1 of the external device 450 may draw image information on the basis of at least one of a user comment, at least one object included in the acquired image, or an upload path. In an embodiment, the image information may be a plurality of items of the image and attribute values corresponding to them. For example, the image information may include information (time, location, weather, etc.) about a photographed environment of the image, information (photographing purpose) about photographing context of the image, information about an object (subject) included in the photographed image, etc.

In an embodiment, the processor 420-1 of the external device 450 may draw image information on the basis of a user comment. In an embodiment, the processor 420-1 of the external device 450 may draw the image information by using a natural language analysis result or a machine learning result. The user comment may have various formats according to an image acquisition path. For example, in response to a user uploading a specific image through SNS while leaving a hashtag such as "#travel#togethermom", the processor 420-1 of the external device 450 may draw "photographing purpose of image—travel" and "object of image—user and mom" as the image information.

In operation 2030, the processor 420-1 of the external device 450 may identify a region of the memory 430-1 which will store the acquired image, on the basis of the drawn image information. In an embodiment, the processor 420-1 of the external device 450 may identify one of the first region 431 and the second region 432 of the memory 430-1, as the region of the memory which will store the acquired image.

In an embodiment, the processor 420-1 of the external device 450 may identify a region of the memory 430-1 which will store the acquired image, on the basis of the image acquisition path. For example, in response to acquiring an image through an SNS account of a figure A, the processor 420-1 of the external device 450 may store the acquired image in the first region 431 specified or dedicated to the figure A.

In an embodiment, the processor 420-1 of the external device 450 may identify a region of the memory 430-1 which will store the acquired image, on the basis of the inclusion or non-inclusion of private information of the image. For example, in response to all information drawn for the acquired image not including the private information, the processor 420-1 of the external device 450 may store information of the acquired image and the drawn image in the second region 432 of the memory 430-1. In another embodiment, in response to part of the information drawn for the acquired image including the private information of the figure A, the processor 420-1 of the external device 450 may store the information of the acquired image and the drawn image in the first region 431 specified or dedicated to the figure A. A mark of notifying the inclusion of the private information may be set to partial information (e.g., "object of image—user and mom") including the private information.

In operation 2040, the processor 420-1 of the external device 450 may store the acquired image in the region of the memory 430-1 identified in operation 2030, together with the drawn image information. The image stored together with the drawn image information is exemplified in FIG. 13 and FIG. 14.

What is claimed is:

1. An electronic device comprising:
a communication module functionally connecting the electronic device and an external device; and
a processor,
wherein the processor is configured to:
receive an image requesting input through the electronic device functionally connected through the communication module;
identify situation information corresponding to the image requesting input, wherein the situation information comprises at least time information and object information;
detect for images corresponding to the situation information, from among one or more images stored in the electronic device or the external device;
in response to detecting at least one image matching an entirety of the situation information, output the detected at least one image;
in response to not detecting the at least one image matching the entirety of the situation information, detect for other images related to at least a part of the situation information from among the one or more images stored in the electronic device or the external device; and
in response to detecting the other images related to the at least the part of the situation information, output a result image generated based on the other images,
wherein outputting the detected at least one image, or the result image includes searching for at least one original image based on the detection, and cropping or segmenting the at least one original image based on a position of an object matching the object information as disposed within the original image, and wherein when multiple original images are detected based on the search, and the multiple original images are cropped or segmented, combining cropped or segmented portions of the original images into a new single image.

2. The electronic device of claim 1, wherein the object information comprises location information.

3. The electronic device of claim 2, wherein the other images corresponding to the part of the situation information less than the entirety includes a timestamp and an object depicted therein that matches the time information and object information of the situation information.

4. The electronic device of claim 2,
wherein the situation information includes a second time condition and a first time condition, and
wherein the other images corresponding to the part of the situation information less than the entirety includes a time that matches the second time information and not the first time information.

5. The electronic device of claim 2, wherein the other images corresponding to the part of the situation information less than the entirety includes an object matching the object information of the situation information.

6. The electronic device of claim 3, wherein the other images corresponding to the part of the situation information less than the entirety includes a first image including a first time earlier than the time information, and a second image corresponding to a second time later than the time information, and
wherein the processor is configured to interpolate the first image and the second image.

7. The electronic device of claim 1, wherein the processor is configured to, in response to private information being comprised in the situation information, check the situation information by converting the private information into public information.

8. The electronic device of claim 1, wherein the processor is additionally configured to receive a user feedback for the output at least one image.

9. The electronic device of claim 1., wherein the cropped or segmented portions of the original images include a predefined attribute; and
wherein the processor is configured to:
in response to detecting the segmenting or cropping of the portions, changing a value of the predefined attribute for each of the segmented or cropped portions.

10. The electronic device of claim 1, wherein the processor is configured to perform processing for suppressing a sense of incongruity between the combined cropped or segmented portions, after combining the segmented or cropped portions into the new single image.

11. An operating method of an electronic device, the method comprising:
receiving an image requesting input through the electronic device functionally connected through a communication module of the electronic device;
identifying, by at least one processor, situation information corresponding to the image requesting input, wherein the situation information comprises at least time information and object information;
in response to detecting at least one image matching an entirety of the situation information, outputting the detected at least one image;
in response to not detecting the at least one image matching the entirety of the situation information, detecting for other images related to at least a part of the situation information from among the one or more images stored in the electronic device or an external device;
detecting other images corresponding to a part of the situation information less than an entirety of the situation information, from among one or more images stored in the electronic device or the external device; and
in response to detecting the other images related to the at least the part of the situation information, outputting a result image related to the part of the situation information using the detected other images,.
wherein outputting the detected at least one image, or the result image includes searching for at least one original image based on the detection, and cropping or segmenting the at least one original image based on a position of an object matching the object information as disposed within the original image, and
wherein when multiple original images are detected based on the search, and the multiple original images are cropped or segmented, combining cropped or segmented portions of the original images into a new single image.

12. The method of claim 11, wherein combining the segmented or cropped regions into the single image includes performing processing for suppressing a sense of incongruity between the combined segmented or cropped regions after combining the segmented or cropped regions into the single image.

* * * * *